United States Patent [19]

Leveque

[11] Patent Number: 5,454,010
[45] Date of Patent: Sep. 26, 1995

[54] SYSTEM AND METHOD FOR CALIBRATION OF FREQUENCY HOPPING

[75] Inventor: J. Howard Leveque, Columbia, Md.

[73] Assignee: LinkPlus Corporation, Columbia, Md.

[21] Appl. No.: 234,849

[22] Filed: Apr. 28, 1994

[51] Int. Cl.[6] .................................................. H04B 1/713
[52] U.S. Cl. .............................................. 375/202; 380/34
[58] Field of Search .................................. 375/1; 380/34, 380/49

[56] References Cited

U.S. PATENT DOCUMENTS

| | | |
|---|---|---|
| 4,271,499 | 6/1981 | Leveque . |
| 4,567,588 | 1/1986 | Jerrim ......................... 375/1 |
| 4,621,365 | 11/1986 | Chiu ............................ 375/1 |
| 4,907,217 | 3/1990 | Leveque . |
| 5,065,451 | 11/1991 | Leveque . |

Primary Examiner—David C. Cain

[57] ABSTRACT

A system and method for calibrating telecommunications systems employs frequency hopping techniques, and more particularly, employs linked compressor-expander (Lincompex) techniques in the transmission of any combination information waveform such as that generated by voice or digital data. A calibration tone sent at each channel frequency is compared against a reference frequency. Based on the results of the comparison, the information waveform is frequency compensated. Alternately, a calibration tone sent at an initial channel frequency is compared to a reference frequency to determine at total frequency error. The system then predicts the total frequency errors for successive channel frequencies. The system frequency compensates the information waveform based on the determined and predicted total frequency errors.

65 Claims, 18 Drawing Sheets

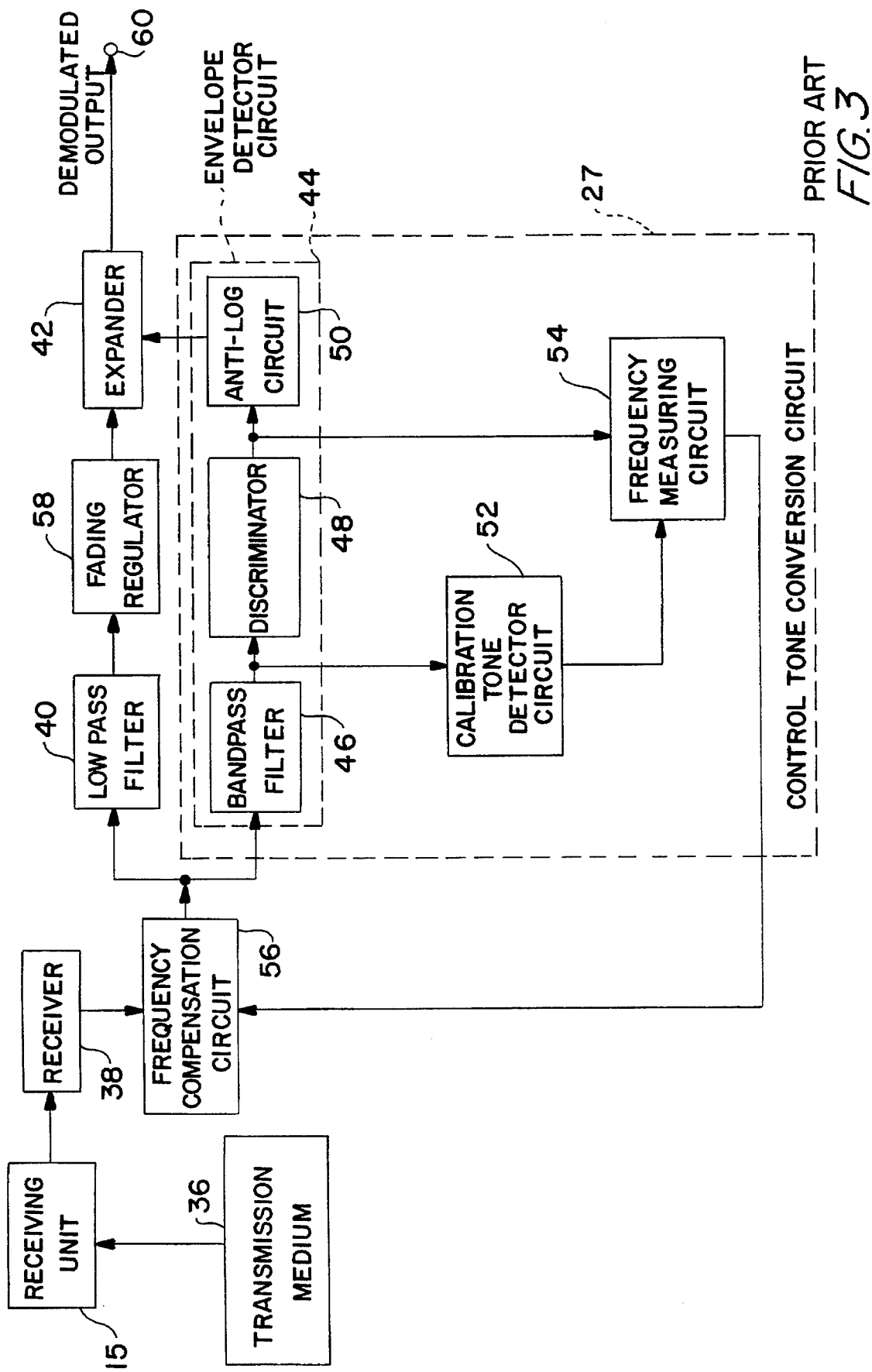
PRIOR ART FIG. 3

$f_{osc}$

BANDWIDTH CHOSEN DEPENDS ON VARYING FACTORS INCLUDING ACCURACY OF COMPRESSION / EXPANSION DESIRED

SYSTEM AND METHOD FOR CALIBRATION OF FREQUENCY HOPPING

FIELD OF THE INVENTION

The present invention relates to the calibration of a telecommunications systems employing frequency hopping techniques in general, and more particularly, to the transmission of any combination information waveform such as that generated by voice or digital data using a linked compressor-expander (Lincompex) system employing frequency hopping techniques.

BACKGROUND OF THE INVENTION

In a conventional telecommunication system employing frequency hopping techniques a transmitter transmits an information waveform, such as a voice signal or a digital signal, over a transmission medium at various transmission or channel frequencies. For instance, the transmitter transmits the information waveform at a first channel frequency for a first period of time, transmits at a second channel frequency for a second period of time, etc. In other words, the channel frequency remains constant for a period of time and then changes or hops to a new channel frequency. The rate at which a transmitter hops to a new frequency is called the hopping rate. A frequency hopping transmitter transmits the information waveform at channel frequencies determined according to a sequence of channel frequencies, called a frequency hopping sequence, and the hopping rate. A frequency hopping algorithm determines the sequence of channel frequencies in the frequency hopping sequence. A simple form of the frequency hopping algorithm consists of a predetermined sequence of channel frequencies. Alternatively, the frequency hopping algorithm consists of a complex equation which generates the next channel frequency.

A receiver receives the information waveform via the transmission medium, and outputs the information waveform. The receiver receives and demodulates the information in accordance with the same frequency hopping algorithm employed by the transmitter. Therefore, the frequency hopping receiver hops to a new channel frequency in synchronization with the transmitter.

Conventional transmitters and receivers employ a crystal standard to generate a standard frequency. A desired channel frequency is then derived from the standard frequency according to well known techniques. Crystal standards have the drawback that the standard frequency generated changes with changes in temperature. This causes frequency error in transmitters and in receivers using crystal standards to derive the channel frequencies. Typically, the frequency error is linearly related or proportional to the channel frequency. The frequency error, however, may be non-linearly related to the channel frequency.

The total frequency error across a link between transmitter and receiver is the sum of the transmitter frequency error and receiver frequency error. In general, the transmitter frequency error will be different from the receiver frequency error. Therefore, a transmitter with a transmitter frequency error of −3 Hz and a receiver with a receiver frequency error of 8 Hz at a given channel frequency will have a total frequency error of 5 Hz due to a reflection around the base band.

A conventional solution to the above discussed problems is to employ crystal standards of such high quality that the frequency errors generated thereby are negligible. The costs of such systems, however, unacceptably limits their feasibility as a solution.

Another conventional solution is the use of crystal ovens. Crystal ovens are a means of maintaining the crystal standard at a constant temperature. These ovens, however, require a significant amount of time to heat up and consume power, thus, restricting their use in several applications. Furthermore, crystal ovens add to the expense of a telecommunications system, and the added weight of crystal ovens makes their use impractical with many types of mobile transmitters and receivers.

While presenting an economical and viable solution to the problems discussed above, the present invention further contemplates a linked compression-expansion (Lincompex) telecommunications system employing frequency hopping techniques. Lincompex systems are well known in the telecommunications art. Such a digital Lincompex system is taught in U.S. Pat. No. 4,271,499 (the "'499 patent") issued Jun. 2, 1981, to Leveque, the Inventor of the present application. The '499 patent only teaches the transmitting of a voice signal over a Lincompex system. However, it has also been found that Lincompex systems can be utilized to transmit data having a complex waveform. Such a system that overcomes the inherent problem of data and envelope overlap (i.e., complex waveform) is fully disclosed in U.S. Pat. No. 4,907,217 (the "'217 patent"), also to Leveque, issued on Mar. 6, 1990, entitled "System and Method of Transmitting A Complex Waveform Over a Communication Channel Utilizing Lincompex Techniques".

In the voice transmission system, as disclosed in the '499 patent, a voice signal is transmitted using Lincompex techniques. This voice signal is band limited and exhibits a control tone 4 (according to the teachings of the '499 patent) which is also band limited and does not overlap the voice band 2, (see FIG. 2(a)).

This system, however, has not been able to compensate for frequency drift or the detuning of the transmitter/receiver system. It is necessary to synchronize the center frequency of the transmitter and receiver to ensure that the control tone and voice signal are not distorted upon reception.

During transmission of the voice signal, frequency drift or the detuning of the transmitter/receiver system can cause a communication problem with the reproduction of the voice signal. More specifically, the control tone used in the reproduction of the compressed voice signal is very sensitive to a change in the frequency, frequency drift. If the frequency of the control tone drifts due to various factors such as detuning of the transmitter/receiver system, (frequency drift of transmitter or receiver modulation oscillators), the power in the reproduced voice becomes weaker in proportion to this frequency change. In the typical Lincompex System, the relationship of the attenuation in the reproduced voice signal and the change in frequency is governed by the ratio 1 db/2 hz. For example, a 30 hz change or drift in frequency can cause a 15 db error in attenuation in the reproduced voice signal. A system for resolving this problem is fully disclosed in U.S. Pat. No. 5,065,451 (the "'451 patent")issued on Nov. 12, 1991, to Leveque, the Inventor of the present invention. FIGS. 1(a) and 3 illustrates the Lincompex System of the '451 patent for overcoming the above discussed problem.

In the modulator of FIG. 1(a) an input 20 of the Lincompex system modulator receives voice information for transmission. A control tone generator or envelope circuit 24 monitors the input voice signal. A compressor 22 compresses the introduced input voice signal. Compression is performed by dividing the signal by its envelope in pseudoreal time to produce a compressed voice signal. To develop the control tone, the system of FIG. 1(a) supplies the envelope signal developed from the output of the envelope detector 26 to a logarithmic (log) amplifier 28 which then develops a signal representative of the logarithm of the envelope signal. The output of this logarithmic amplifier 28 is supplied to a control terminal of a voltage control FM oscillator 30, which generates a frequency that varies about a center frequency $F_c$ in relation to the variation of the input voltage supplied to its control terminal from the logarithmic amplifier 28, to develop an envelope signal as an output of the control tone generator (envelope circuit) 24.

A summer 32 then sums the compressed voice signal developed at the output of the compressor 22 with the envelope signal developed at the output of the FM oscillator 30 to form a combined information signal.

In this speech transmission system, this combined information signal output from the summer 32 is provided to a transmitter 34 which transmits the signal over a desired transmission medium 36. In a typical embodiment, a single side band transmitter would normally transmit the modulated combined information signal across the airways in a known manner.

As shown in FIG. 3, the demodulator of the Lincompex System for the '451 patent utilizes a frequency compensation circuit which corrects the frequency of the incoming combined information waveform such that the attenuation problem is substantially eliminated.

As illustrated in FIG. 3, the prior art Lincompex demodulator includes a receiving unit 15 which receives a modulated combined information signal from the transmission medium 36, which normally includes an antenna for receiving radio waves from the atmosphere, which supplies the received modulated combined information signal to a receiver 38. The receiver 38 demodulates the transmitted signal to produce a demodulated version of the combined information signal. Typically, this receiver would be a single side band receiver which mixes the received modulated combined information signal with the channel frequency to produce a base band combined information signal.

To recover only the voice signal from such a combined voice/envelope information signal, a low pass filter 40 removes the voice information 2 of FIG. 2(a) from the combined information signal to recover the compressed voice signal containing only the voice information 2. This compressed voice signal is transmitted according to the Lincompex techniques at a substantially complete modulation of the transmitter 34 of FIG. 1(a). The compressed voice signal is passed through a fading regulator 58. The fading regulator 58 is a fading regulator similar to the one described in the '499 patent which removes any audio level variations not removed by the automatic gain control circuitry in the receiver 38. This compressed modified voice signal output from the fading regulator 58 is then expanded to produce the necessary dynamic range for the recovered voice signal to be supplied at the output 60.

Accordingly, an expander 42, similar to the one described in the '499 patent, is utilized which essentially multiplies the compressed modified voice signal developed at the output of the fading regulator 58 by an envelope signal which is recovered by a control tone conversion circuit 27.

The control tone conversion circuit 27 comprises a band pass filter 46 which recovers only the control tone which is represented by the control tone information signal 4 in FIG. 2(a). The control tone originally developed by the FM oscillator 30 of FIG. 1(a) is then passed through a frequency discriminator 48. The frequency discriminator 48 measures the instantaneous frequency of the control tone and produces a voltage level representative of this measured frequency. In this case, a the voltage level also represents the logarithm of the original envelope signal. The antilogarithm circuit 50 is utilized to recover the original envelope signal. This logarithmic signal is then supplied to an anti-logarithm circuit 50. The antilogarithm circuit 50 is utilized to recover the original envelope developed by the envelope detector 26 of FIG. 1(a). This original envelope signal is used by the expander 42 to recover the original voice signal by expanding the compressed voice signal to provide the original signal to the output 60. This control tone conversion circuit 27 is similar to the control tone conversion circuit described in the '499 patent.

The control tone conversion circuit 27 also comprises a calibration tone detector circuit 52 and a frequency measuring circuit 54. The calibration tone detector circuit 52 detects the initial calibration tone transmitted by the transmitter to determine when the frequency of the calibration tone is to be compared with a reference frequency to determine a frequency error.

This calibration tone is generated in a manner similar to the process disclosed in the '499 patent. A control unit 88 outputs control signals to the control tone generator 24, switch 86 and switch 87. As discussed in the '499 patent, the control unit 88 is a transmit key detect circuit which detects transmitter key-down. In response to the control signals, the calibration tone generator 24 outputs an unattenuated and unmodulated signal of a predetermined frequency, and the switch 87 disconnects the compressor 22 from the summer 32. Thus, the summer 32 only outputs the unattenuated and unmodulated signal of predetermined frequency. The unattenuated and unmodulated signal of predetermined frequency can serve as the calibration tone, or the switch 86, in response to the control signals, disconnects and reconnects the summer 32 to the transmitter 34 to create a predetermined pattern of the unattenuated and unmodulated signal as the calibration tone. Alternatively, switch 86 is on attenuator which, in response to the control signals, disables and enables attenuation of the unmodulated and unattenuated signal according to a predetermined pattern. Furthermore, the attenuator could switch between anti-attenuation and attenuation. For instance, the anti-attenuation could increase by 5 db the unmodulated and unattenuated signal, and then attenuate by 31 db the unmodulated and unattenuated signal.

The predetermined frequency of the calibration tone preferably corresponds to the center frequency of voltage control FM oscillator 30, but is not limited thereto. Furthermore, the control unit 88 preferably causes the calibration tone to be generated for a 280–300 millisecond duration, but is not limited thereto. After sending the calibration tone for a given duration, the control unit 88 causes switches 86 and 87 to close, and permits the control tone generator 24 to output the control tone.

As a further alternative, the calibration tone can be generated as shown in FIG. 1(b). In FIG. 1(b), the switch 86, in response to a control signal from calibration tone generator 89, disconnects the transmitter 34 from the summer 32 and connects the transmitter 34 to the calibration tone generator 89. The calibration tone generator 89 can include a function generator (not shown) which generates the calibration tone for transmission by transmitter 34.

The calibration tone detector circuit 52 generates a control signal representing that a calibration tone has been received. The detection of the calibration tone utilizes the conventional method described in the '499 patent. The frequency measuring circuit 54 receives this signal from the calibration tone detector circuit 52 and compares this signal representative of the frequency of the calibration tone as generated by the discriminator 48 with the desired standard frequency, i.e, the intended control tone center frequency. If a difference in the frequencies is determined, the frequency measuring circuit 54 recognizes that frequency error is present and generates a frequency error signal, which is stored and used by a frequency compensation circuit 56 so that the frequency compensation circuit 56 can correctly frequency translate the frequency of the combined information waveform. The above frequency error determination can be implemented using software techniques.

An example of the frequency compensation circuit 56 is a typical phase shifting circuit or frequency translator described in the '451 patent and in FIG. 6(a). These circuits usually include a Hilbert Transform Circuit, an oscillator, phase shifter, multipliers, and a summer. In this example, (as shown in FIG. 6(a)), the signal path is split into two paths, A and B. Path A is connected to a multiplier 203. Connected to multiplier 203 is a voltage controlled oscillator 205 and a summer 211. The voltage controlled oscillator 205 is also connected to a 90° phase shifting device 209. Furthermore, Path B is connected to a Hilbert Transform Circuit 201. Connected to the Hilbert Transform Circuit 201 is a multiplier 207. This multiplier 207 is connected to the 90° phase shifting device 209 and the summer 211. The summer is connected to the input of the Lincompex demodulator.

An incoming signal is split into two paths, A and B. The signal traveling along path A is modulated, multiplied, by multiplier 203, with a cosine waveform type signal generated by the voltage controlled oscillator 205. The frequency of this cosine signal is determined according to the frequency error measured in the frequency measuring circuit 54 with a range between 0 to 100 Hz. The modulated signal from multiplier 203 is supplied to summer 211 to be added with a signal modified along path B.

The signal traveling along path B is first passed through a Hilbert Transform Circuit 201 which shifts the positive frequency components of the signal by −90° and shifts the negative frequency components of the signal by +90°. After being transformed by the Hilbert Transform Circuit 201, the signal is modulated, multiplied, by multiplier 207, with a sine waveform type signal. This sine signal is a 90° shifted version of the cosine signal generated by the voltage controlled oscillator 205. The frequency of this signal is equal to the frequency of the cosine signal. The modulated signal is supplied to the summer 211 so that its negative and positive components can be summed with the modulated signal of path A. The signal generated by the summer 214 is a frequency compensated signal to be used by the Lincompex demodulator.

Another example of the frequency compensation circuit 56 is a typical frequency shifting circuit or frequency translator as shown in FIG. 6(b). These circuits usually include oscillators, multipliers, and filters. In this example, (as shown in FIG. 6(b)), a multiplier 103 receives the incoming signal. The multiplier 103 is connected to a first frequency compensator oscillator 101 and a first filter 105. The first filter 105 is connected to a multiplier 109. Connected to multiplier 109 is a second frequency compensator oscillator and a second filter 111. The second frequency oscillator 107 is connected to the frequency measuring circuit 54. The second filter 111 is also connected to the input of the Lincompex demodulator.

A first frequency compensator oscillator 101 produces a frequency corresponding to a first frequency which is greater than the bandwidth of the signal being shifted, necessary to prevent the problem of overlap of the two side band signals which occur when the signal is multiplied by a frequency less than the bandwidth of the signal. For example, if the bandwidth of the combination information signal is 3000 Hz, it might be desirable to set the frequency $F_{OSCA}$ of the first frequency compensation oscillator 101 at 9000 Hz. The output of the first frequency compensation oscillator 101 is mixed with the combination information signal within a first frequency compensation mixer 103 and the lower sideband is filtered by a frequency compensation highpass filter 105 which removes the lower sideband produced by mixing the $F_{OSCA}$ with the combined information signal using mixer 103 to develop a frequency raised combination information signal. A second frequency compensation oscillator produces a frequency $F_{OSCB}$ which corresponds to the first frequency minus the frequency change. For example, if the combined information signal must be raised 12 Hz, the second frequency compensation oscillator 107 generates a frequency $F_{OSC2}=F_{OSC1}-12$, which is multiplied with the frequency raised combination information signal using a second frequency compensation mixer 109. This time a frequency compensation low pass filter 111 is used to remove the upper sideband, thereby raising (or lowering) the frequency of the combination information signal by the frequency error in this example, 12 Hz. In this prior art Lincompex System, the second frequency compensation oscillator 107 is a voltage controlled oscillator, thus producing a second frequency in accordance with the voltage level of the control signal received from the frequency measuring circuit 54.

With respect to the transmission of data, the Lincompex techniques used may or may not be different from the transmission of voice signals due to the complex nature of the data waveform. This technique is fully discussed in the '217 patent, and the frequency compensation technique therefor is fully discussed in the '451 patent. The frequency compensation technique, however, will be briefly described below.

As described in the '451 patent, a data signal is transmitted using Lincompex techniques. The problem associated with transmission of such data signal arises from the frequency band overlap occurring within such a complex waveform as shown in FIG. 2(b) where the data signal overlaps the envelope of the data signal. Furthermore, as described above with respect to the transmission of a voice signal, frequency drift can be experienced with the transmission of data signals.

FIGS. 4 and 5 illustrate collectively a Lincompex System where the input signal is frequency shifted prior to the compression/expansion operation to enable transmission of a wideband complex waveform using Lincompex techniques, and the received digital signal is frequency compensated to account for frequency drift. In FIGS. 4 and 5, as in all of the figures of the present invention, like elements throughout the drawing figures are identified with like numbers.

Whereas the FIGS. 1(a) and (b) prior art Lincompex systems normally receive speech or voice at their input 20, the embodiment of FIG. 4 would normally receive a data input such as a 16-tone parallel-tone or multi-tone data signal as illustrated in FIG. 7(a) at its input 20. However, it should be understood that any complex data waveform including voice may be transmitted over a communications channel.

A mixer 100 is provided to frequency shift the input data frequency spectra shown in FIG. 7(a), to a desired higher frequency $F_{OSC}$ to ensure that no overlap, as shown in FIG. 2(b), between the input data band, when compressed, and the control tone signal frequency band occurs. Accordingly, an oscillator 102 supplies the mixing frequency $F_{OSC}$ to a frequency multiplier or mixer 104 where it is mixed with the data input A of FIG. 7(a) to produce the mixed data B of FIG. 7(b). A filter 106 is then provided to band pass filter the mixed output to remove an undesired one of the two side bands produced by the mixing process. The frequency response of the filter 106 is illustrated in FIG. 7(c). After filtering, only a single side band is left which is frequency shifted to a desired frequency at the output D of the filter 106 as illustrated in FIG. 7(d). This frequency shifted data input of FIG. 7(d) is then treated by prior art Lincompex techniques by a compressor 22, envelope circuit 24, summer 32 and transmitter 34, in the manner described with respect to FIG. 1 to produce a combined data and envelope signal for transmission on the transmission medium 36. As explained previously, the compression operation enlarges the frequency spectrum of the compressed data as shown in FIG. 7(f). The envelope circuit 24 generates an envelope spectrum E which would have a selected bandwidth depending on various factors including the accuracy of compression to be achieved. However, it is important that the bandwidth of the envelope spectrum not overlap that of the compressed data so that full compression and recovery of the data can be accomplished by the Lincompex system.

FIG. 5 illustrates a prior art Lincompex demodulator which automatically frequency compensates the compressed complex waveform by frequency shifting the total bandwidth according to a measured frequency error prior to the splitting of the complex waveform into its components, a data signal and a control tone, thereby substantially eliminating data distortion due to frequency drift or the detuning of the transmitter/receiver system. The demodulator of FIG. 5, differs from that of FIG. 3 in that frequency shifted data is obtained from expander 42. This frequency shifted data may be provided via a line to an output where it may be detected by a detector sensitive to the frequency shifted tones contained within the frequency shifted data. Alternatively, as shown in FIG. 5, a receiver mixer 110 including a multiplier 108, frequency oscillator 112 and filter 114 may be utilized to shift the frequency shifted data back to its original frequency band. Accordingly, the digital information may be readily recovered.

While prior art Lincompex techniques allow elimination of frequency drift for a single channel frequency, the prior art Lincompex systems do no correct for the total frequency errors in cooperation with the frequency hopping techniques used by a telecommunications system.

Neither conventional frequency hopping techniques nor prior art Lincompex techniques eliminate frequency drift across a telecommunications link employing high frequency hopping rates.

SUMMARY OF THE INVENTION

An object of the present invention is to provide a system and method for calibrating a telecommunication system using frequency hopping techniques.

Another object of the present invention is to provide a system and method for calibrating a telecommunication system using frequency hopping techniques wherein the frequency compensation for successive channel frequencies is predicted.

A further object of the present invention is to predict the frequency compensation for successive frequencies when the transmitter frequency error is proportional to the channel frequency and/or when the receiver frequency error is proportional to the channel frequency.

An additional object of the present invention is to predict the frequency compensation for successive frequencies when the transmitter frequency error is non-linearly related to the channel frequency and/or when the receiver frequency error is non-linearly related to the channel frequency.

Another object of the present invention is to achieve the above discussed objectives with a Linked Compression-Expansion telecommunications system.

These and other related objectives are achieved by providing a method for receiving an information waveform and calibration tone transmitted over a communication channel using frequency hopping techniques wherein a transmitter transmits said information waveform and said calibration tone by hopping to different channel frequencies determined by a frequency hopping algorithm, comprising the steps of:

(a) receiving and demodulating, with a receiver, a calibration tone, said transmitter transmitting said calibration tone each time said transmitter changes a channel frequency, said calibration tone being independently distinguishable from said information waveform, and said receiver hopping to said different channel frequencies in accordance with said frequency hopping algorithm;

(b) receiving and demodulating, with said receiver, said information waveform, and said receiver hopping to said different channel frequencies in accordance with said frequency hopping algorithm;

(c) determining a frequency of said calibration tone as received in said step (a);

(d) determining a frequency error by comparing output from said step (c) to a reference frequency; and (e) frequency compensating said information waveform received in step (b) according to said frequency error.

The objectives of the present invention are further fulfilled by providing a method for receiving an information waveform and calibration tone transmitted over a communication channel using frequency hopping techniques wherein a transmitter transmits said information waveform and said calibration tone by hopping to different channel frequencies determined by a frequency hopping algorithm, said transmitter producing transmitter frequency error, said method comprising the steps of:

(a) receiving and demodulating, with a receiver, a calibration tone transmitted by said transmitter, said calibration tone being independently distinguishable from said information waveform, said receiver producing receiver frequency error;

(b) receiving and demodulating, with said receiver, said information waveform, said receiver hopping to said different channel frequencies in accordance with said frequency hopping algorithm, and said receiver producing said receiver frequency error;

(c) determining a frequency of said calibration tone as received by said step (a);

(d) determining a first total frequency error associated with a current channel frequency by comparing output from said step (c) to a reference frequency;

(e) frequency compensating said information waveform received in step (b) according to said first total frequency error determined in said step (d);

(f) predicting successive total frequency errors for successive channel frequencies in said frequency hopping sequence based on said first total frequency error determined in said step (d).

The objectives of the present invention are additionally achieved by providing an apparatus for receiving an information waveform and calibration tone transmitted over a communication channel using frequency hopping techniques wherein a transmitter transmits said information waveform and said calibration tone by hopping to different channel frequencies determined by a frequency hopping algorithm, comprising:

a receiver receiving and demodulating an information waveform and a calibration tone, said calibration tone being transmitted by a transmitter each time said transmitter changes the channel frequency, said calibration tone being independently distinguishable from said information waveform, and said receiver hopping to said different channel frequencies in accordance with said frequency hopping algorithm;

a frequency measuring circuit determining a frequency error based on said calibration tone received by said receiver; and a frequency compensating circuit, operatively connected to said receiver, compensating said information waveform according to said frequency error.

The objective of the present invention are further achieved by providing an apparatus for receiving an information waveform transmitted over a communication channel using frequency hopping techniques wherein a transmitter transmits said information waveform and said calibration tone by hopping to different channel frequencies determined by a frequency hopping algorithm, comprising:

a receiver receiving and demodulating an information waveform and a calibration tone, said calibration tone being transmitted by a transmitter each time said transmitter changes a channel frequency, said calibration tone being independently distinguishable from said information waveform, and said receiver in hopping to said different channel frequencies accordance with said frequency hopping algorithm;

a frequency measuring circuit determining a first total frequency error associated with a current channel frequency based on said calibration tone received by said receiver;

a frequency compensating circuit frequency compensating said information waveform according to said first total frequency error; and a predicting circuit predicting successive total frequency errors for successive channel frequencies in said frequency hopping sequence based on said first total frequency error.

The objectives of the present invention are additionally achieved by providing a method for transmitting an information waveform over a communications channel using frequency hopping techniques, comprising the steps of:

(a) inputting an information waveform;

(b) transmitting, with a transmitter, said information waveform by hopping to different channel frequencies determined by a frequency hopping algorithm;

(c) transmitting a calibration tone each time said transmitter changes a channel frequency.

The objectives of the present invention are also achieved by providing a method for transmitting an information waveform over a communications channel using frequency hopping techniques, comprising the steps of:

(a) inputting an information waveform;

(b) transmitting, with a transmitter, said information waveform by hopping to different channel frequencies determined by a frequency hopping algorithm;

(c) transmitting a calibration tone after a predetermined number of channel frequency changes.

The objectives of the present invention are further achieved by providing an apparatus for transmitting an information waveform over a communications channel using frequency hopping techniques, comprising:

a transmitter which transmits an information waveform by hopping to different channel frequencies determined by a frequency hopping algorithm, said transmitter generating a change indication signal when changing said channel frequency;

a tone generator which generates a calibration tone;

switch means, connected between said transmitter, an input receiving said information waveform and said tone generator, for controlling a connection of said transmitter to said input and said tone generator; and a control unit which, based on said change indication signal, causes said switch to disconnect said input from said transmitter and to connect said tone generator to said transmitter.

These and other related objectives of the present invention will become more readily apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description hereinbelow and the accompanying drawings which are given by way of illustration only, and thus do not limit the present invention.

FIGS. 3 illustrates a prior art Lincompex demodulator for compensating for frequency drift in a transmitted voice signal;

The above-mentioned drawings will be described in detail in the following detailed description wherein like reference numerals identify like elements.

DETAILED DESCRIPTION OF THE PREFERRED EMBODIMENTS

Certain embodiments of the present invention will be described with reference to a general description of Lincompex techniques which may be implemented digitally or otherwise. The preferred embodiments, however, contemplate the use of digital Lincompex techniques to practice the teachings of the present application. Accordingly, to the extent necessary, the Applicant hereby incorporates by reference the entirety of the disclosure U.S. Pat. No. 4,271,499 entitled "Method and Apparatus for Digitally Implementing a Linked Compressor-Expander Telecommunications System" invented by the inventor of the present application; the entirety of U.S. Pat. No. 4,907,217 entitled "System and Method of Transmitting A Complex Waveform Over A Communication Channel Utilizing Lincompex Techniques" invented by the inventor of the present application; and the entirety of U.S. Pat. No. 5,065,451 entitled "System and Method of Frequency Calibration In A Linked Compression-Expansion (Lincompex) System", invented by the inventor of the present invention.

Figure 8:
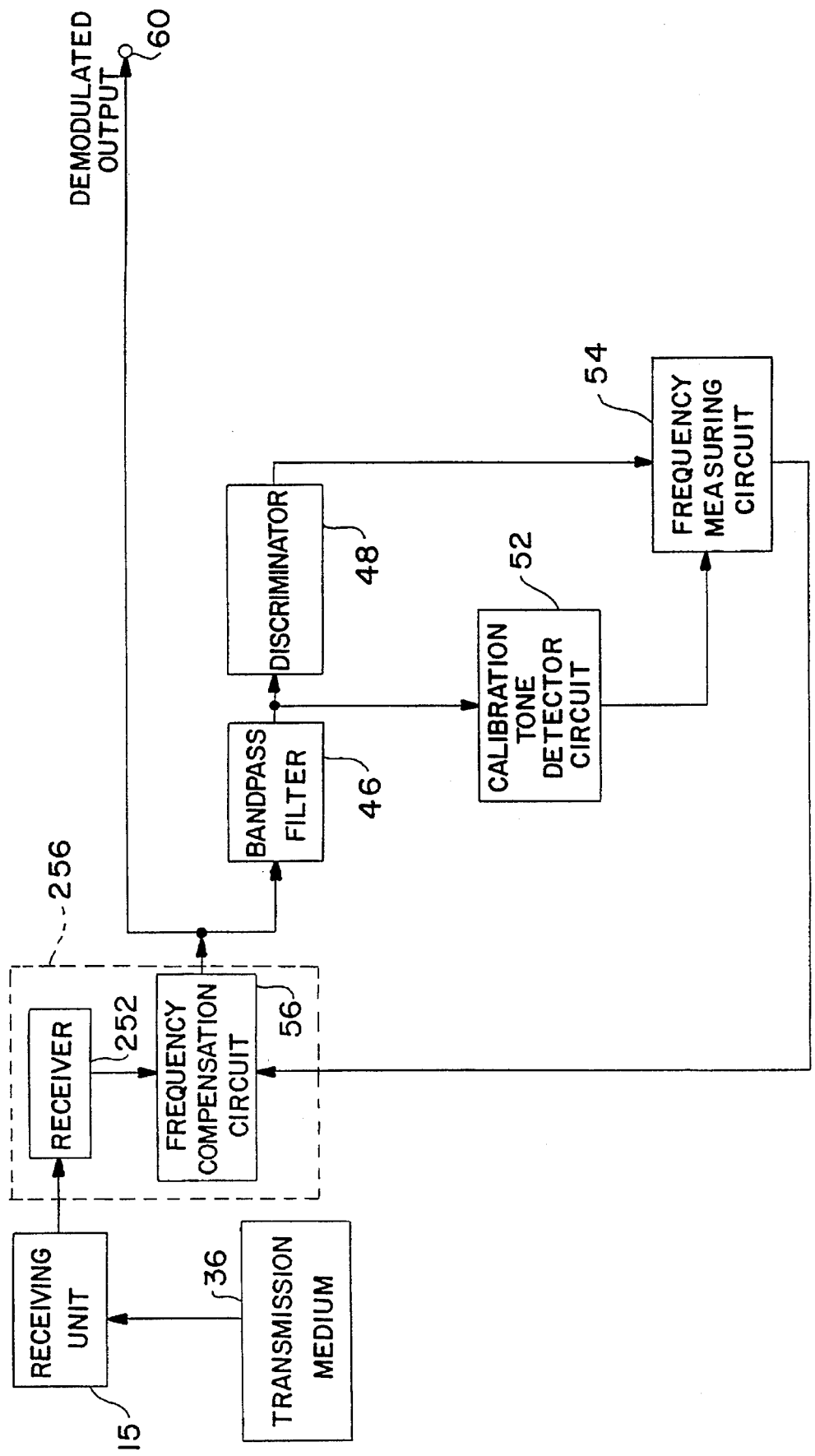
FIG. 8 illustrates a demodulator of a telecommunications system using frequency hopping techniques according to the present invention.

FIG. 8 illustrates one embodiment of the present invention where the demodulator automatically frequency compensates an information waveform, such as a voice signal or data signal (digital signal), transmitted using frequency hopping techniques. The demodulator frequency compensates the information waveform by frequency shifting the total band width according to a measured frequency error at each channel frequency.

Figure 9:
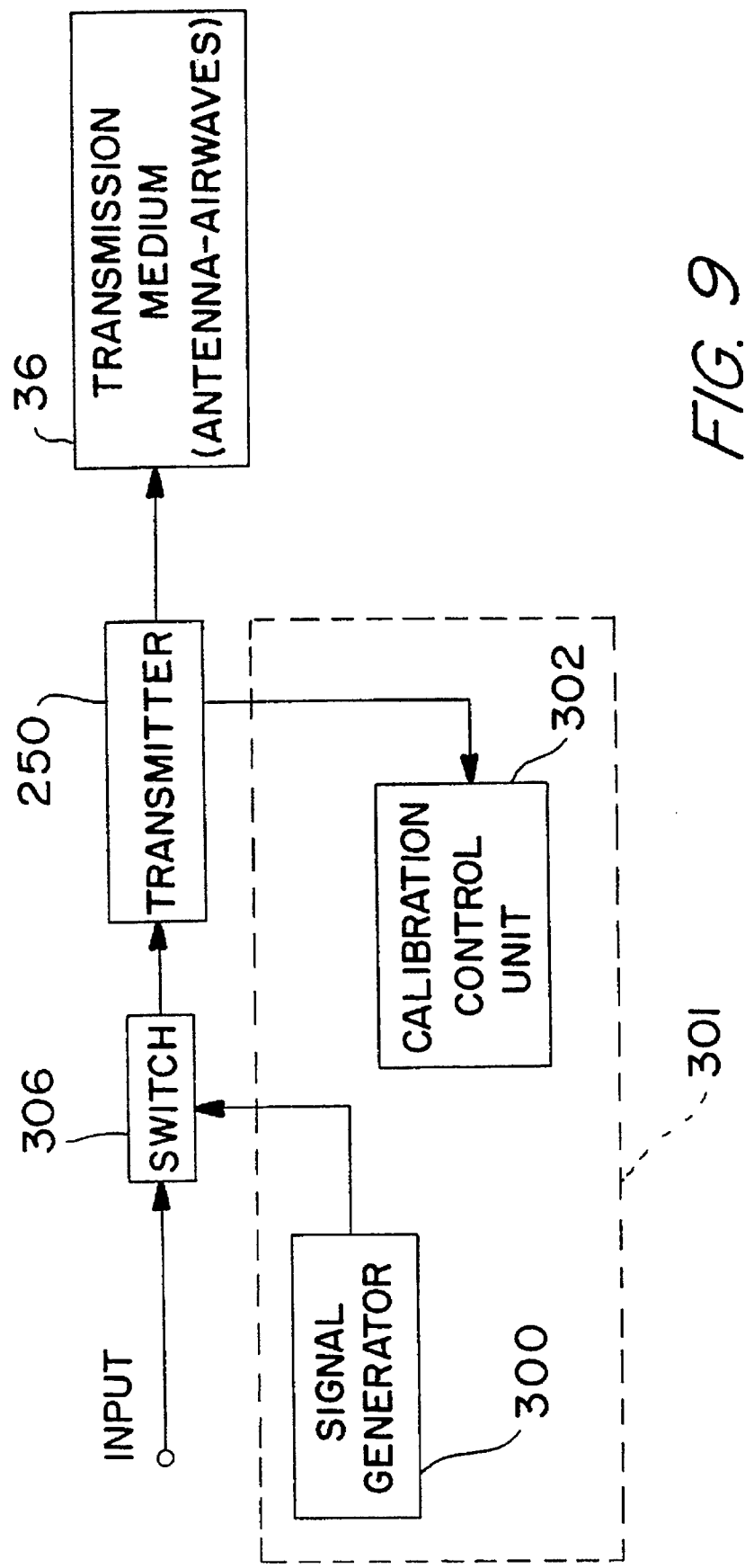
FIG. 9 illustrates a modulator of a telecommunications system using frequency hopping techniques according to the present invention.

FIG. 9 illustrates a modulator employing a frequency hopping transmitter 250 for transmitting an information waveform across a transmission medium 36 using frequency hopping techniques. The transmission medium 36 utilized in the present invention may be any type of transmission medium for example, an atmospheric radio wavelength, a telephone line, coaxial cable or fiber optic cable, or any other path usable for the transmission of the selected combination information waveform such as voice or data. Also, the components of the information waveform can be sent via separate transmission mediums.

The modulator of FIG. 9 also employs a switch 86 connected between an input of the modulator and frequency hopping transmitter 250, a calibration control unit 302 connected to the transmitter 250 and switch 306, and a signal generator 300 connected to switch 306. The calibration control unit 302 together with function generator 300 forms a calibration tone generator 301. The calibration control unit 302 in conjunction with signal generator 300 and switch 306 causes the transmission of a calibration tone. The operation of the modulator shown in FIG. 9 is described in detail below.

In FIG. 8 as in all figures, like reference numerals are used to label like elements; therefore, previously described elements, whether described in the Detailed Description of the Preferred Embodiments or the Background of the Invention, will not be described in detail if they were previously described.

To frequency compensate for transmitter and receiver frequency errors, this embodiment of the present invention contemplates, as shown in FIG. 8, a demodulator including a receiving unit 15, frequency hopping receiver 252, frequency compensation circuit 56, band pass filter 46, discriminator 48, calibration tone detector 52, and frequency measuring circuit 54.

The receiving unit 15 connected to frequency hopping receiver 252 normally includes an antenna, and receives the transmitted information waveform. The receiver 252 is a frequency hopping receiver using frequency hopping techniques, and is connected to frequency compensation circuit 56. As shown by dashed lines in FIG.8, the frequency hopping receiver 250 and frequency compensation circuit 56 can be included in a single unit, a frequency compensation receiver 256.

The frequency compensation circuit 56 is further connected to band pass filter 46 and output 60. The band pass filter 46 serves to separate the calibration tone from the information signal. The modulator transmits the calibration tone so that the calibration tone is independently recognizable from the information waveform. In other words, the band of the information waveform does not overlap the band of the calibration tone.

The discriminator 48 and calibration tone detector circuit 52 are connected to and will each receive the output of band pass filter 46. The discriminator 48, as discussed in the background of the present invention with respect to FIG. 3, measures the instantaneous frequency of the output of band pass filter 46 (i.e. the calibration tone) and produces a voltage level representative of the measured frequency. The calibration tone detector 52 generates a control signal indicating that a calibration tone has been received as discussed in the background of the present invention with respect to FIG. 3. The frequency measuring circuit 54 receives the output of discriminator 48 and calibration tone detector 52. Receipt of the control signal from calibration tone detector circuit 52 enables frequency measuring circuit 54. When enabled, frequency measuring circuit 54 compares the frequency measured by discriminator 48 with a reference frequency of the calibration tone. If a difference in the frequencies is determined, the frequency measuring circuit 54 recognizes that frequency error is present and generates a frequency error signal, a voltage preferably, which is stored and used by frequency compensation circuit 56.

Figure 6A:
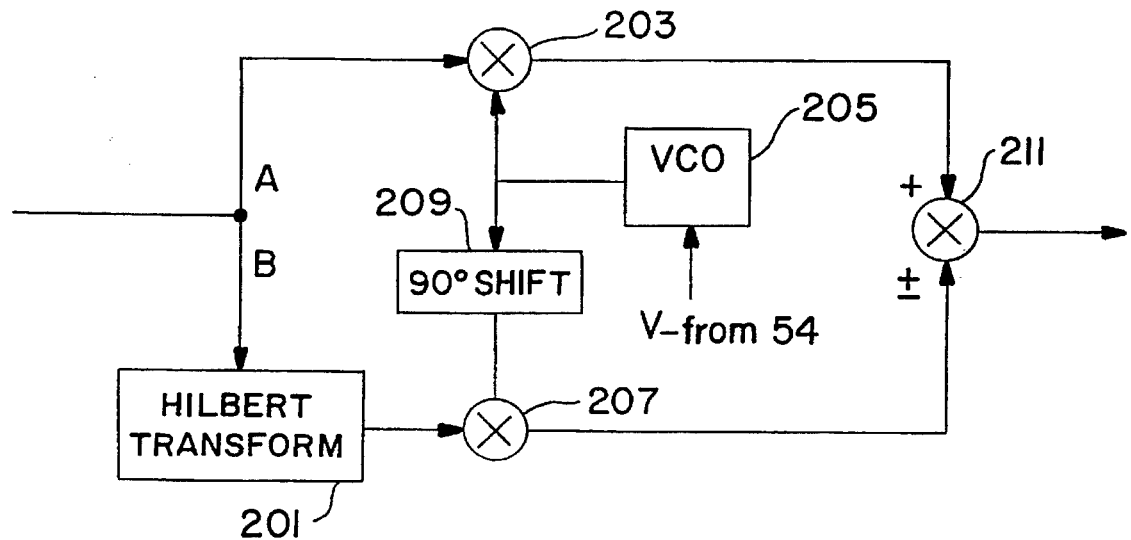
FIGS. 6(a) and 6(b) illustrate an example of a frequency compensation circuit such as shown FIG. 3.
Figure 6B:
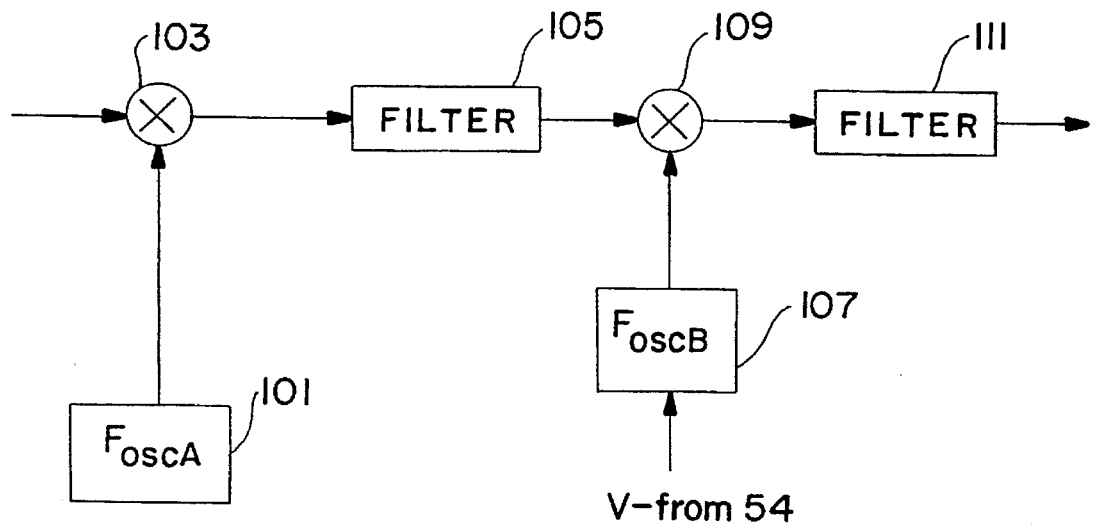
Figure 7A:
FIG.7(a)–7(f) illustrate the frequency spectrum of the data signal transmitted using the prior art Lincompex techniques.
Figure 7B:
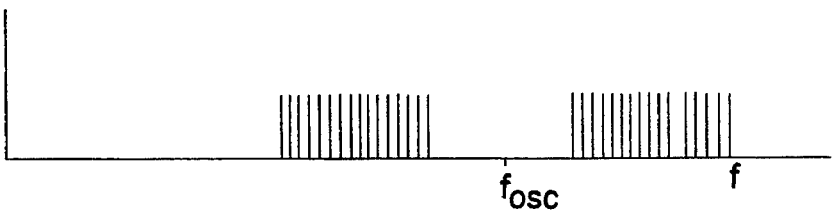
Figure 7C:
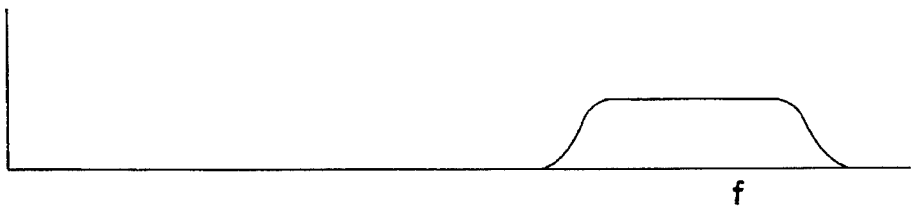
Figure 7D:
Figure 7E:
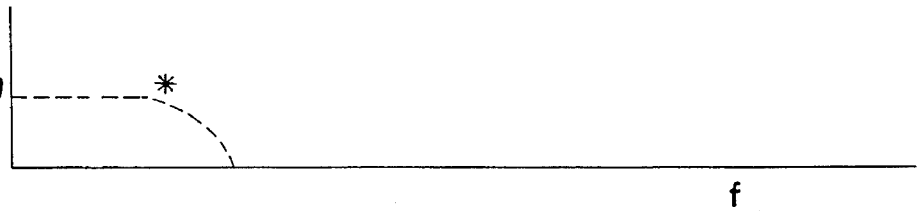
Figure 7F:
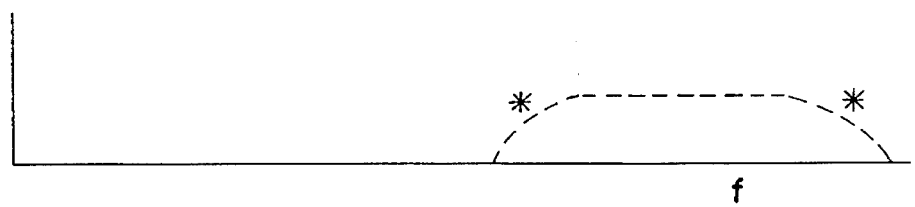

The frequency compensation circuit 56 frequency translates the information signal according to the frequency error signal received from frequency measuring circuit 54. Examples of frequency compensation circuit 56 were discussed in the background of the present invention with respect to FIGS. 6(a) and 6(b). The above frequency error determination can also be implemented using software techniques.

In transmitting the information waveform according to frequency hopping techniques, transmitter 250 will produce a certain amount of frequency error. The amount of error will differ with each channel frequency. The receiver 252, receiving and demodulating the information waveform according to frequency hopping techniques, also produces frequency error which differs between channel frequencies. Since the modulator transmits a calibration tone at each channel frequency, frequency compensation circuit 56 will compensate for transmitter frequency error and receiver frequency error at each channel frequency. Thus, the total frequency error across the link can be eliminated.

Figure 10:
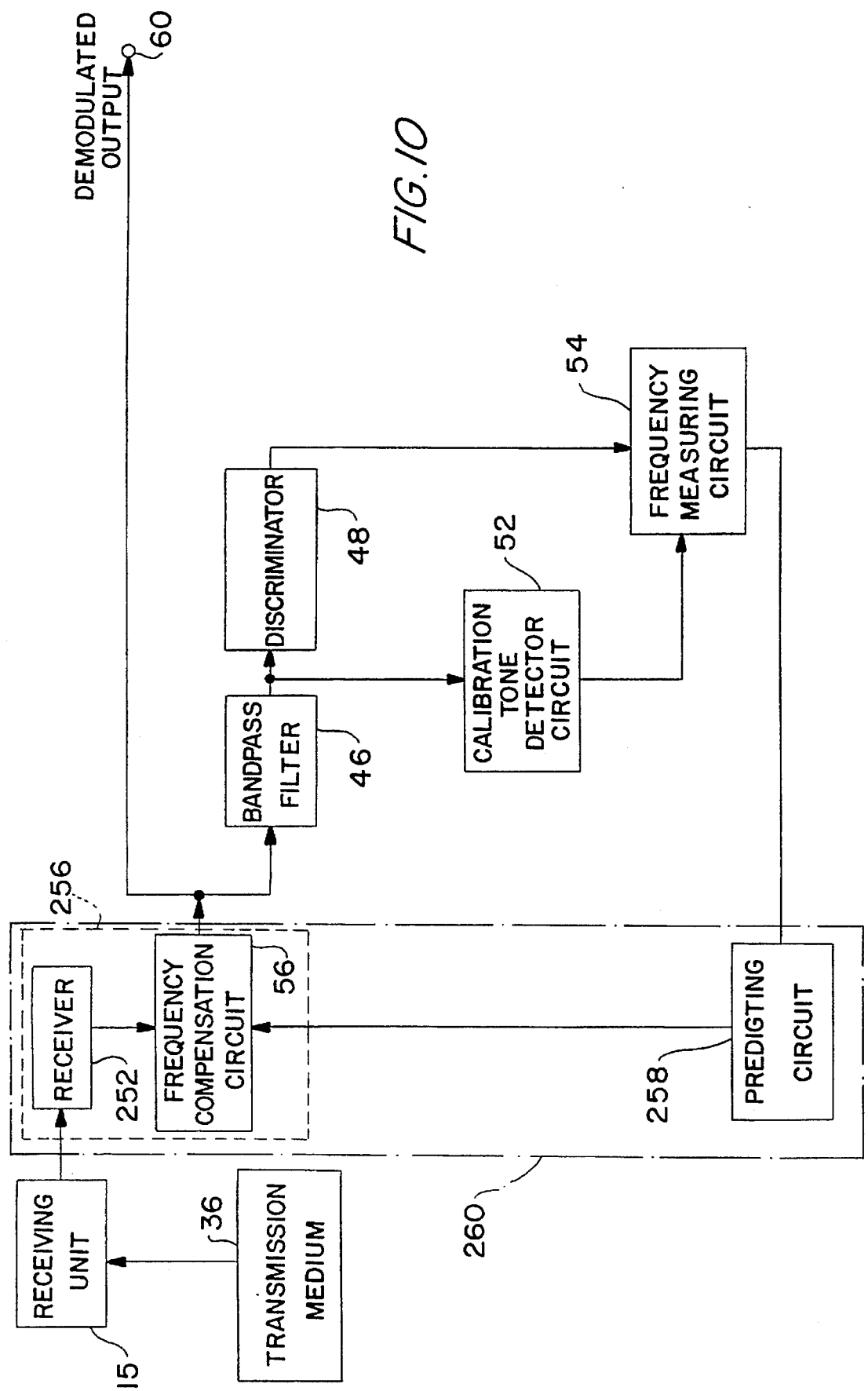
FIG. 10 illustrates another demodulator of a telecommunications system using frequency hopping techniques according to the present invention.

FIG. 10 illustrates a further embodiment of the present invention. The embodiment of FIG. 10 is similar to that of FIG. 8, except the embodiment of FIG. 10 further includes a predicting circuit 258 connected between frequency measuring circuit 54 and frequency compensation circuit 56. FIG. 10 shows by dashed lines, as did FIG. 8, that a frequency compensation receiver can includes the frequency hopping receiver 252 and frequency compensation circuit 56. FIG. 10 also shows by alternating long and short dashed lines that a predicting receiver 260 can include predicting circuit 258, frequency compensation circuit 56 and receiver 252.

Figure 11:
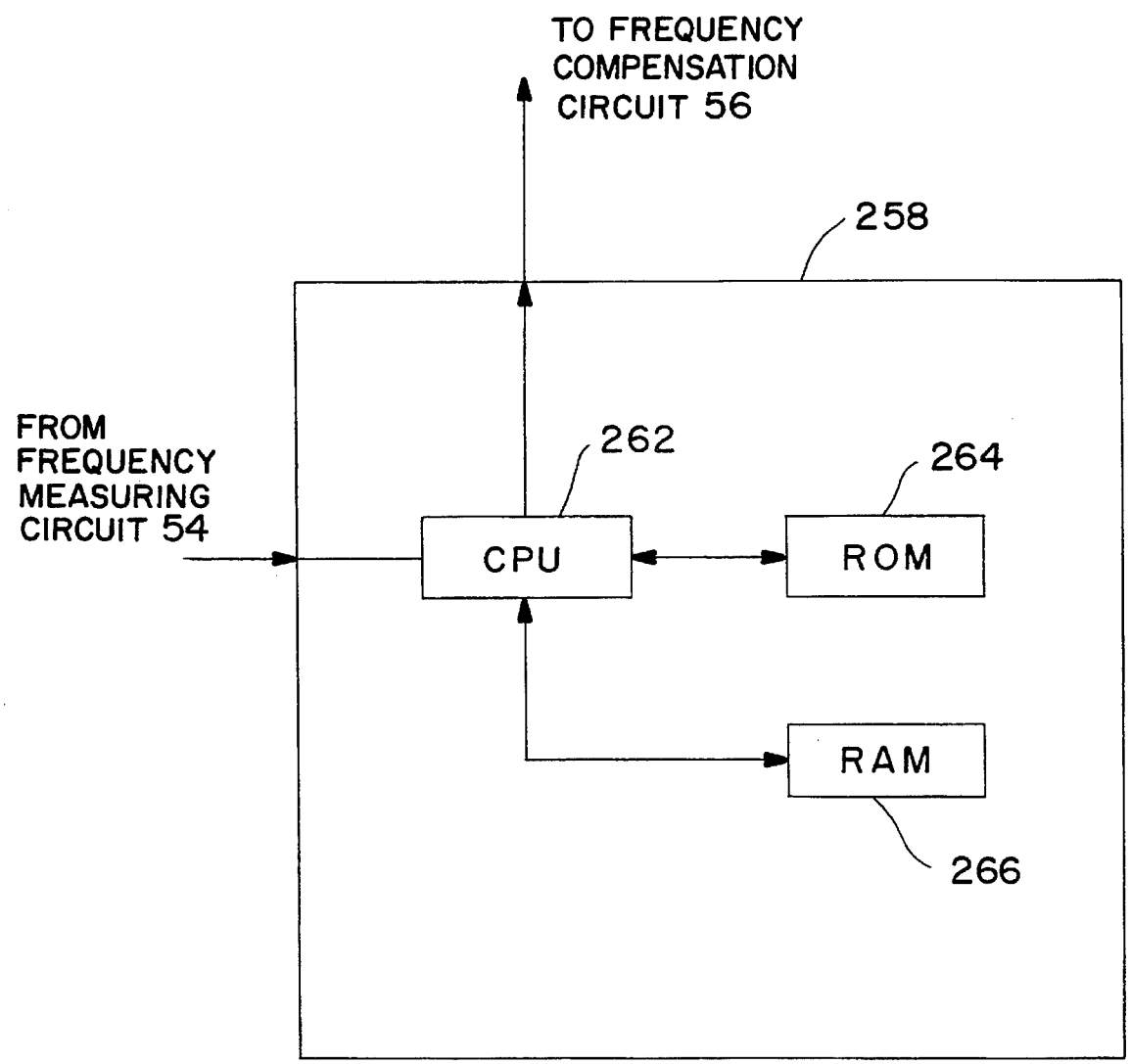
FIG. 11 illustrate a predicting circuit of the present invention.

FIG. 11 illustrates an embodiment of predicting circuit 258. The predicting circuit 258 includes a CPU 262, a ROM 264, and a RAM 266. The CPU 262 is connected to both the ROM 264 and RAM 266. In operation, the CPU 262 receives the total frequency error measured by frequency measuring circuit 54, processes the error based on a program stored in ROM 264 and data stored in RAM 266, and outputs the total frequency error for the current channel frequency and successive channel frequencies to frequency compensation circuit 56. The program run by CPU 262 is easily coded based upon the methods of operation described below. The embodiment of predicting circuit 258 is not limited to the microprocessor implementation shown in FIG. 11 but can be implemented as a hard-wired circuit.

Figure 4:
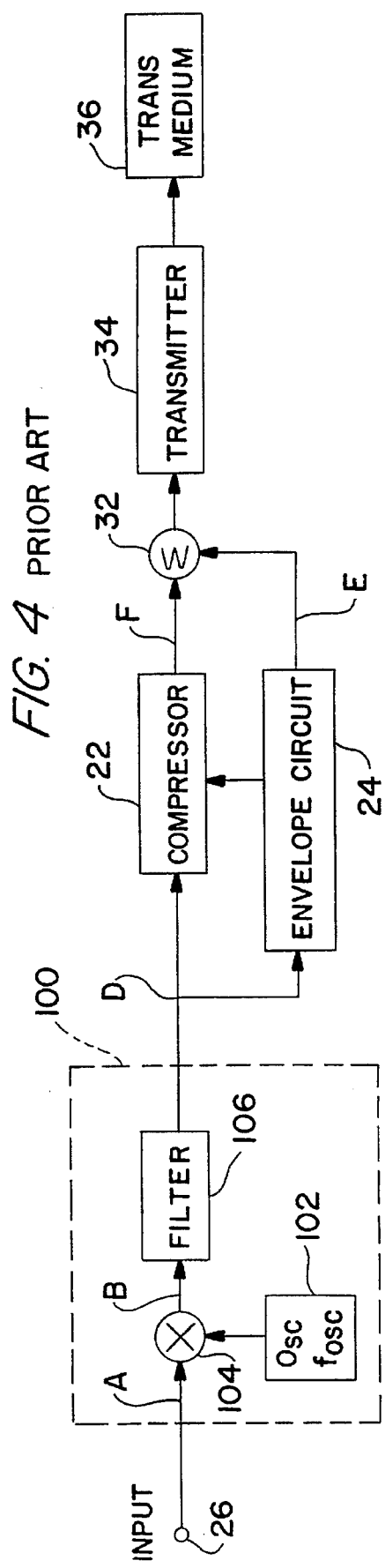
FIGS. 4 illustrate the modulator of a prior art Lincompex system used to transmit data (complex waveform)

The embodiments described above with respect to FIGS. 8 and 10 can also operate if the band of the calibration tone overlaps the band of the information waveform. In such a situation, a mixer 100 as described in the background of the present invention with respect to FIG. 4 can be inserted between the input and switch 86 of the modulator illustrated in FIG. 9. As discussed in the background of the present invention, this mixer 100 frequency shifts the information waveform to prevent overlap between the information waveform and another signal such as the calibration tone.

Figure 5:
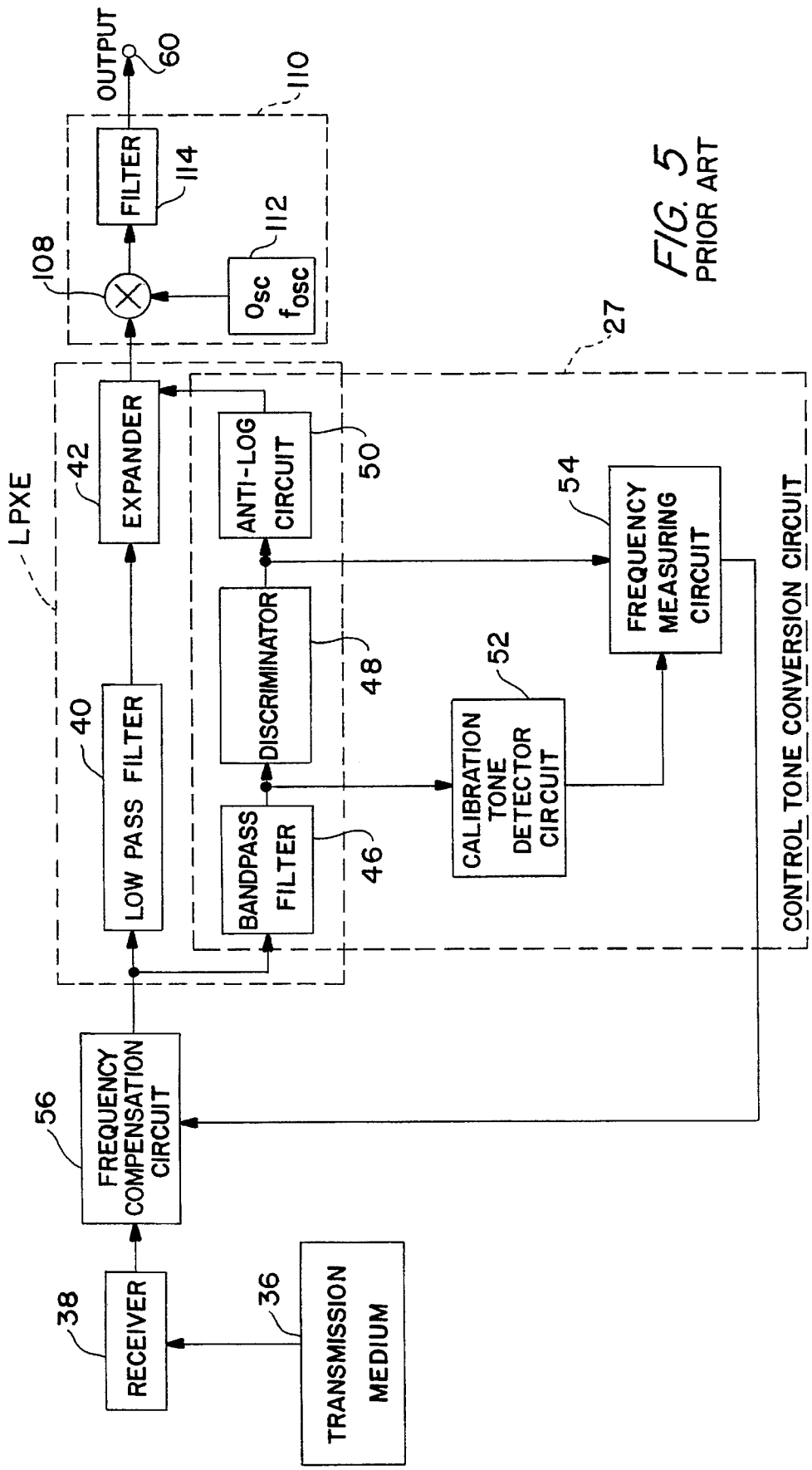
FIG. 5 illustrates a prior art Lincompex demodulator for compensating for frequency drift in a transmitted data signal.

Additionally, a receiver mixer 110 can be inserted in the embodiments shown in FIGS. 8 and 10 between the output 60 and frequency compensation circuit 56. As discussed in the background of the present invention with respect to FIG. 5, the receiver mixer 110 frequency shifts the information waveform back to its original frequency as received at the input of the transmitter.

With respect to the above described embodiments, it should be understood that the calibration tone can be transmitted in any desired fashion. Preferably, however, the calibration tone is a constant frequency burst pattern of a predetermined duration.

FIGS. 12–15(b) illustrate the application of the embodiments shown in FIGS. 8 and 10 to a Lincompex telecommunications system.

Figure 12:
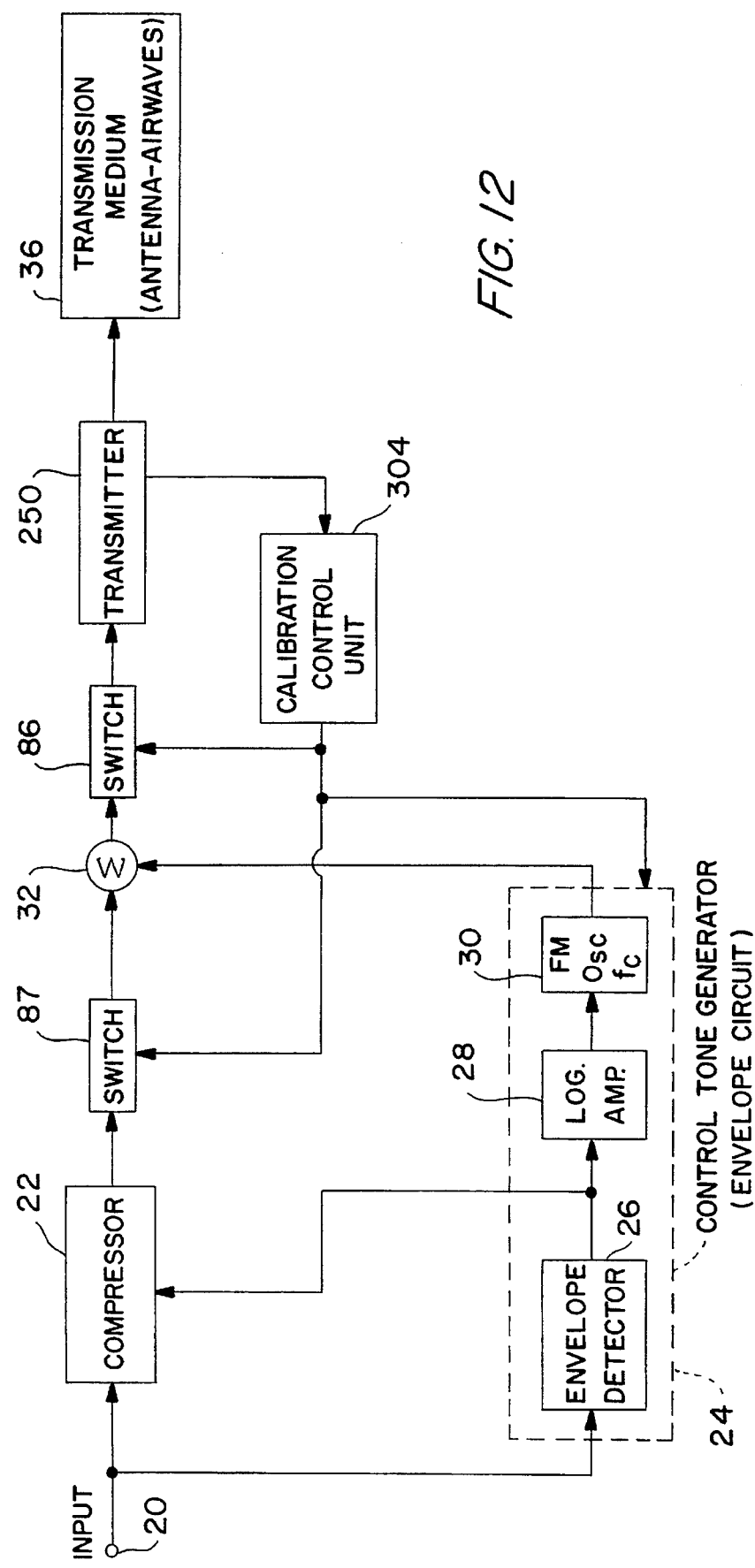
FIG. 12 illustrates a modulator of a Lincompex system using frequency hopping techniques for transmitting voice signals according to the present invention.

FIG. 12 shows the application of the modulator illustrated in FIG. 9 to a Lincompex telecommunications system for voice signals. The structure of the modulator illustrated in FIG. 12 is similar to the modulator described in the background of the present invention with respect to FIG. 1(a) except that the transmitter 34 has been replaced by the frequency hopping transmitter 250 shown in FIG. 9, and a calibration tone is generated under the control of a calibration control unit 304 connected to transmitter 250, switch 86, switch 87, and control tone generator 24. The description of previously described elements will not be repeated. The operation of calibration control unit 304 is described below.

Figure 13A:
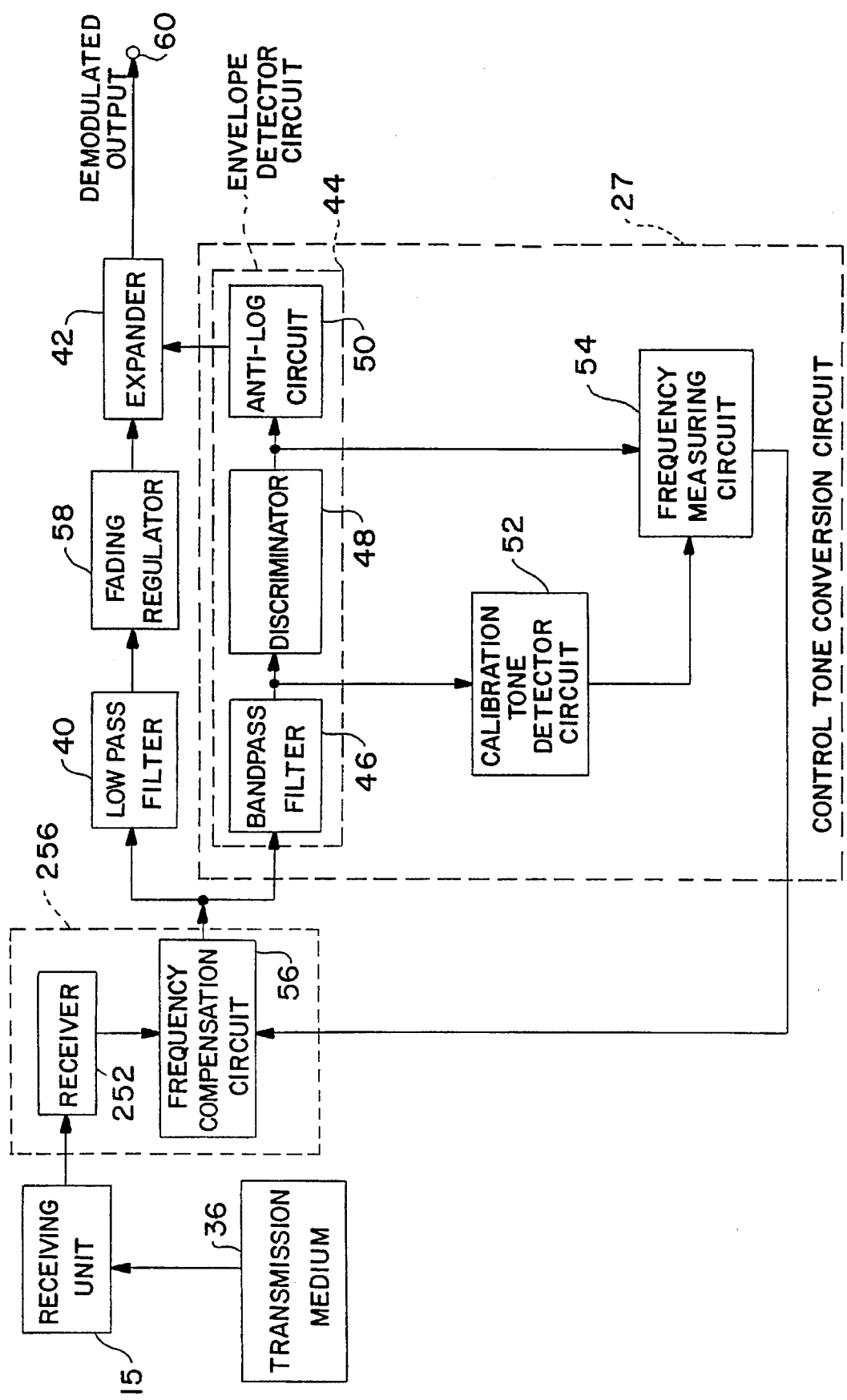
FIGS. 13(a) and 13(b) illustrate demodulators of a Lincompex system using frequency hopping techniques for receiving voice signals according to the present invention.
Figure 13B:
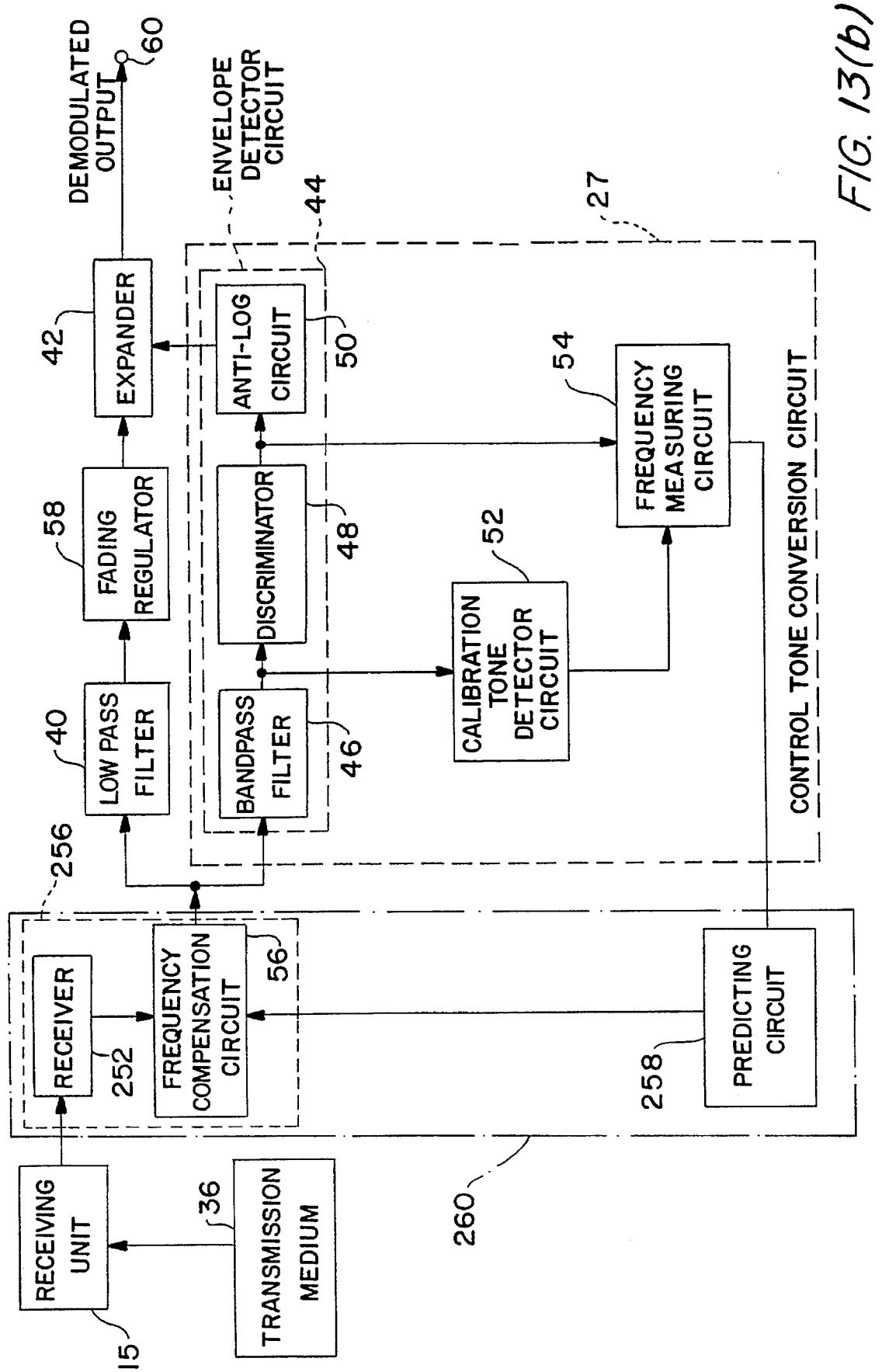

FIGS. 13(a) and 13(b) illustrate the application of the embodiments shown in FIG. 8 and 10 to a Lincompex telecommunications system for voice signals, respectively. In FIGS. 13(a) and 13(b), a low pass filter 40, fading regulator 58, expander 42, and anti-log circuit 50 have been added. The low pass filter 40 receives the output at the frequency compensation circuit 56 and separates the compressed voice signal from the information waveform. The fading regulator 58 connected to the low pass filter 40 receives the separated compressed voice signal and removes any audio level variations not removed by the automatic gain control circuitry of the frequency hopping receiver 252. The anti-log circuit 50 is connected to discriminator 48 and receives the output therefrom. The anti-log circuit 50 recovers the logarithm of the envelope as discussed in the background of the present invention. The expander 42 connected to fading regulator 58 and anti-log circuit 50 expands the compressed voice signal by multiplying the compressed voice signal by the output of the anti-log circuit 50.

Figure 14:
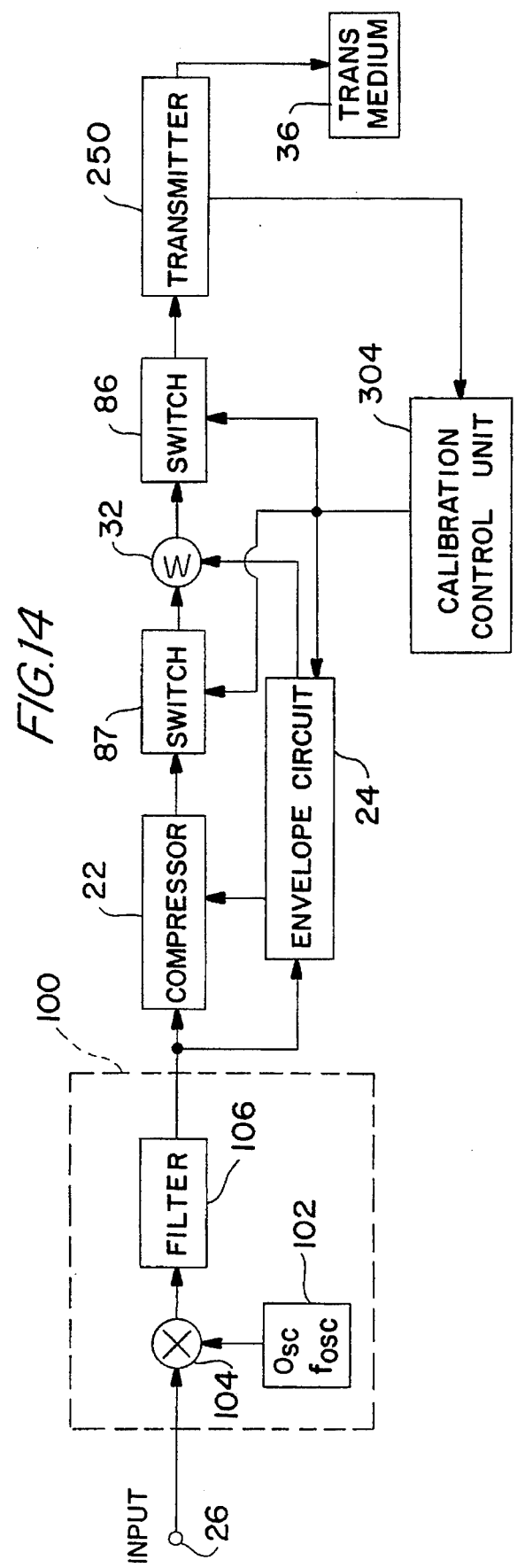
FIG. 14 illustrates a modulator of a Lincompex system using frequency hopping techniques for transmitting data signals according to the present invention.

FIG. 14 illustrates the modulator for a Lincompex telecommunications system transmitting digital signals according to the present invention. The modulator of FIG. 14 is similar to the modulator described in the background of the present invention with respect to FIGS. 1(a) and 4 except that transmitter 34 has been replaced with frequency hopping transmitter 250, and a calibration tone is generated under the control of a calibration control unit 304 connected to transmitter 250, switch 86, switch 87, and control tone generator 24. The description of previously described elements will not be repeated herein. The operation of calibration control unit 304 is described below with respect to FIG. 12.

It should be understood, that the calibration tone can be transmitted in any desired fashion. Preferably, this calibration tone is transmitted at the center frequency of the control tone as a constant frequency burst pattern for a predetermined time period, but other frequencies could also be utilized.

Figure 15A:
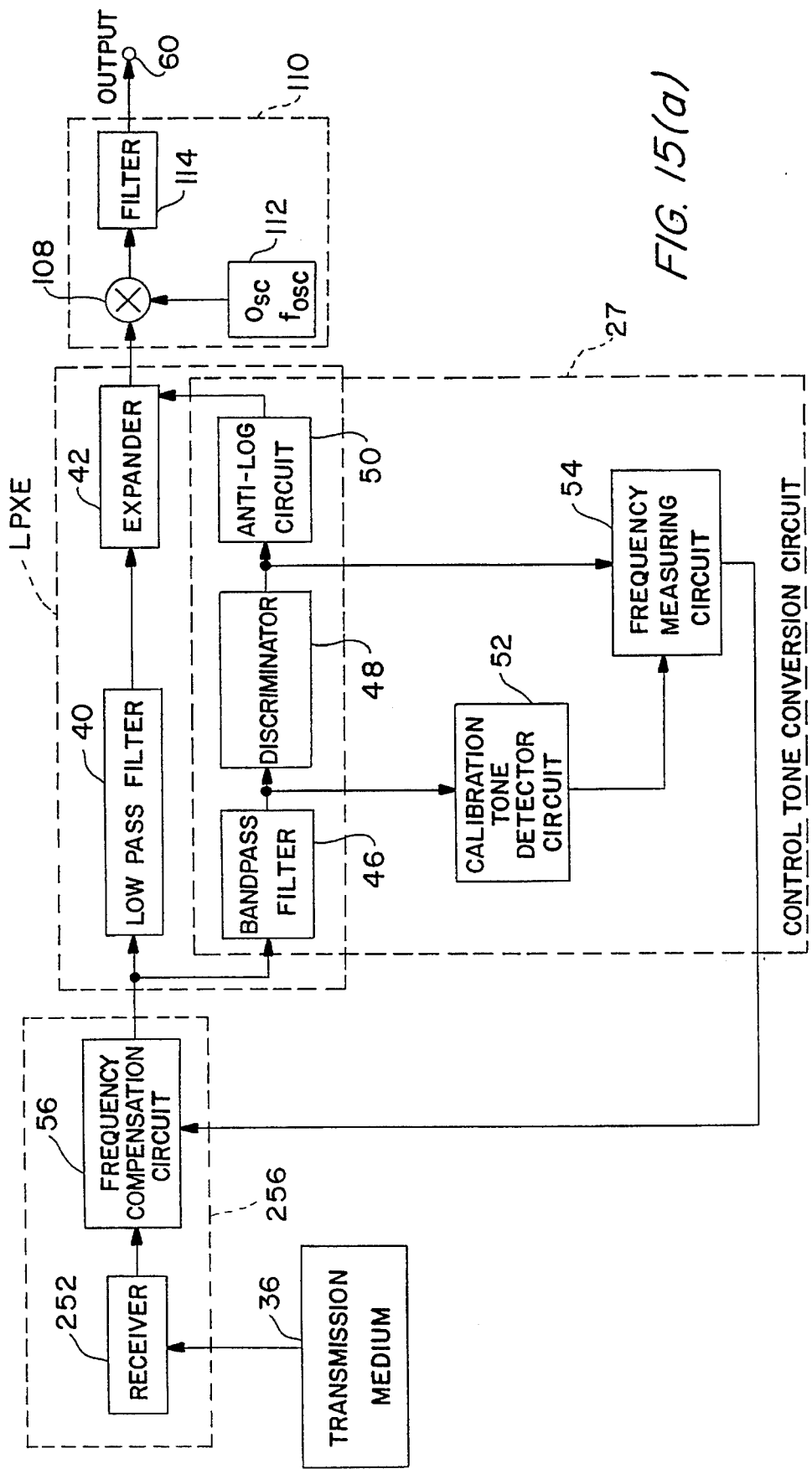
FIGS. 15(a) and 15(b) illustrate demodulators of a Lincompex system using frequency hopping techniques for receiving data signals according to the present invention.
Figure 15B:
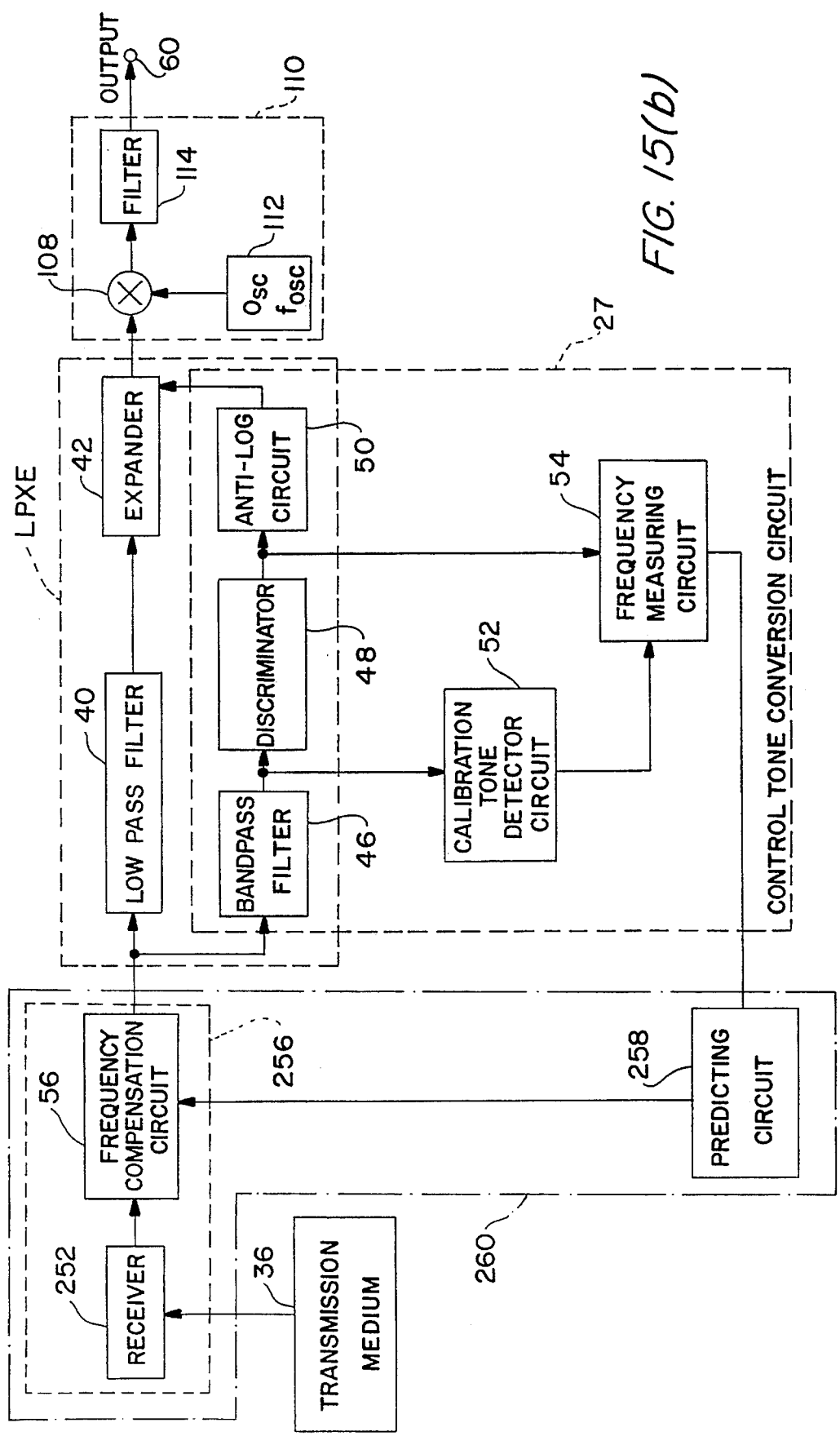

FIGS. 15(a) and 15(b) illustrate the application of the embodiments shown in FIGS. 8 and 10 to a Lincompex telecommunications system for data signals (digital signals), respectively. In FIGS. 15(a) and 15(b), a low pass filter 40, expander 42, anti-log circuit 50 and receiver mixer 110 have been added. The low pass filter 40 receives the output at the frequency compensation circuit 56 and separates the compressed data signal from the information waveform. The anti-log circuit 50 is connected to discriminator 48 and receives the output therefrom. The anti-log circuit 50 recovers the logarithm of the envelope as discussed in the background of the present invention. The expander 42 connected to low pass filter 40 and anti-log circuit 50 expands the compressed data signal by multiplying the compressed data signal by the output of the anti-log circuit 50. The receiver mixer 110 then frequency shifts the expanded data signal back to its original frequency.

OPERATION OF THE PRESENT INVENTION

The method of operation of the telecommunication system shown in FIGS. 8–9 will now be described. This description, however, equally applies to the telecommunications systems shown in FIGS. 12–13(a) and FIGS. 14–15(a). The operation of the Lincompex elements in FIGS. 12–13(a) and FIGS. 14–15(a) were adequately described in the background of the present invention, and, therefore will not be repeated.

The modulator of FIG. 9 in a first method of operation, operates such that the modulator transmits a calibration tone each time frequency hopping transmitter 250 changes the channel frequency according to the frequency hopping algorithm. Therefore, a calibration tone will be transmitted at each channel frequency. The calibration control unit 302 receives a signal from transmitter 250 indicating a change in the channel frequency. In response to this signal, calibration control unit 302 outputs a control signal to switch 306. The switch 306 operates to disconnect the input of the modulator from the transmitter 250, and to connect the output of the signal generator 300 to the transmitter 250. The signal generator 300 generates a calibration tone the same as generated by control tone generator 24, switch 86, and control unit 88 as discussed in the background of the present invention. Alternatively, the calibration control unit 302 could include a processor which would run the frequency hopping algorithm used by the transmitter 250 in synchronization with the transmitter 250. Thus, calibration control unit 302 could determine when to generate a calibration tone without receiving a signal from the transmitter 250.

Figure 1A:
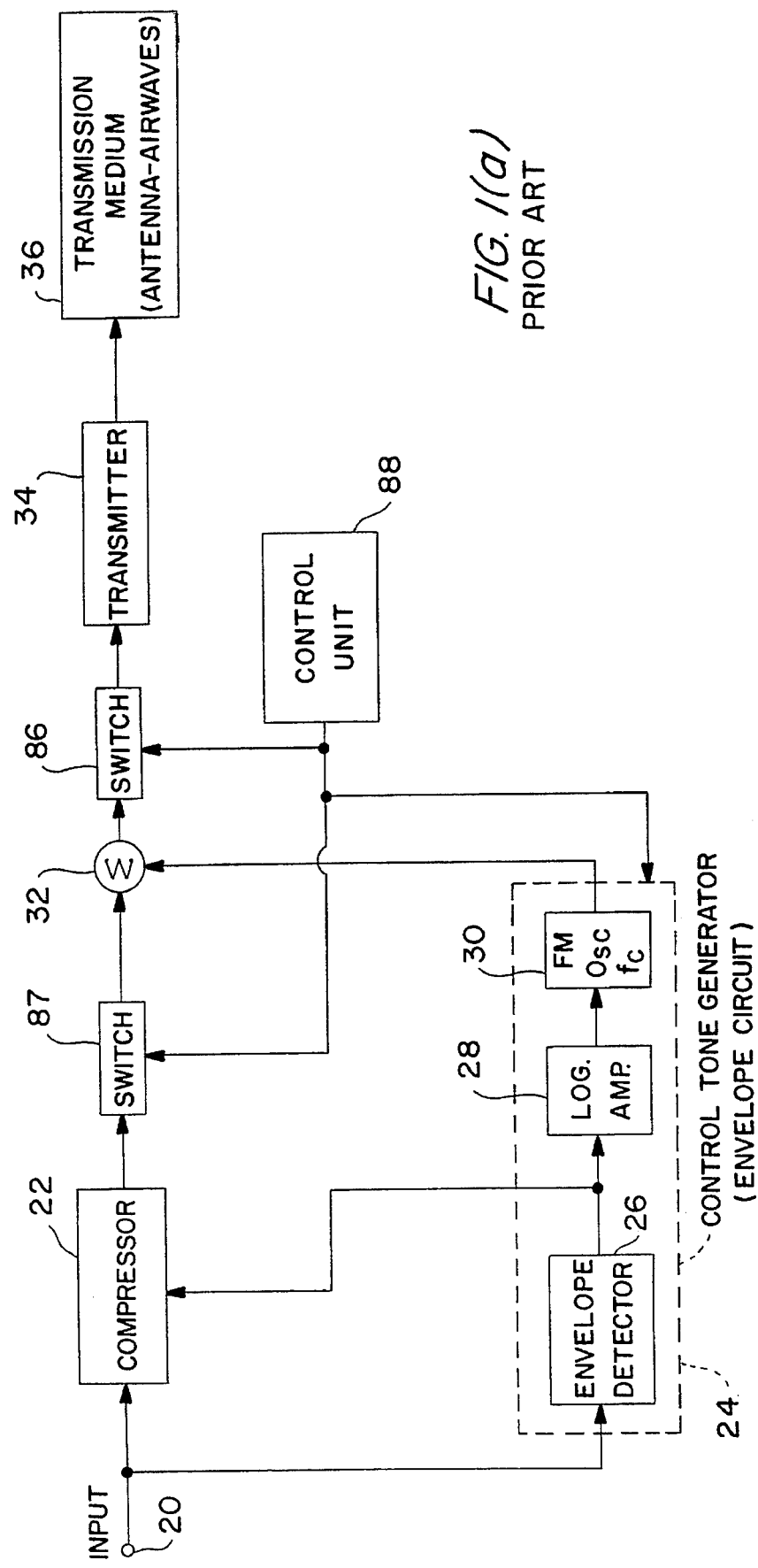
FIGS. 1(a) and (b) illustrate modulators of prior art Lincompex systems.
Figure 1B:
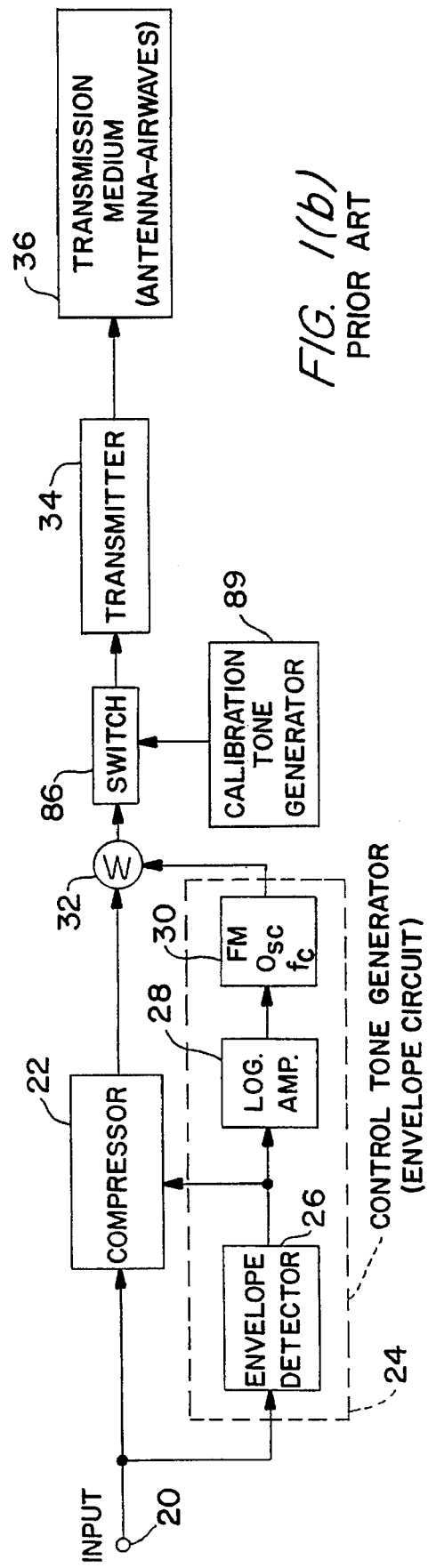
Figure 2A:
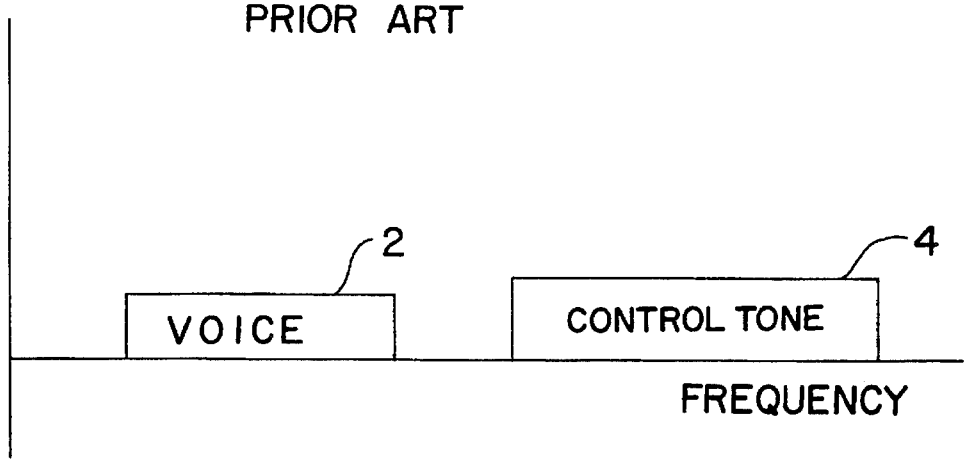
FIGS. 2(a) and 2(b) illustrate typical relationships between the frequency band of typical human voice and the modulated envelope of this voice, and that which may be encountered by typical data and the frequency band of this data's envelope.
Figure 2B:
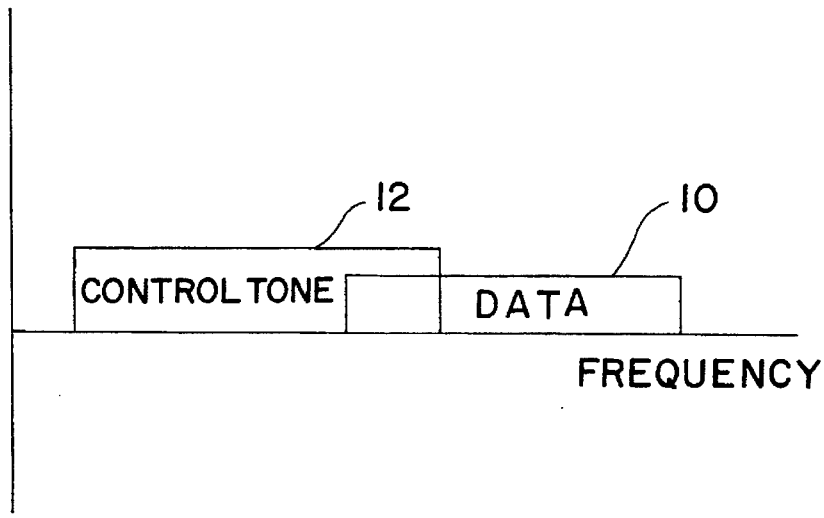

The modulators of FIGS. 12 and 14 operate in a similar manner to those discussed above with respect to FIG. 9 and prior art FIG. 1(a). In FIGS. 12 and 14, a calibration control unit 304 receives a signal from the transmitter 250 indicating a change in the channel frequency. In response to this signal, the calibration control unit 304 outputs control signals to the control tone generator 24, switch 86 and switch 87. The calibration tone generator 24 outputs an unattenuated and unmodulated signal of a predetermined frequency and the switch 87 disconnects the compressor 22 from the summer 32. Thus, the summer 32 only outputs the unattenuated and unmodulated signal of predetermined frequency. The switch 86, in response to the control signals, disconnects and reconnects the summer 32 to the transmitter 250 to create a predetermined pattern of the unattenuated and unmodulated signal as the calibration tone. Alternatively, switch 86 is an attenuator which, in response to the control signals, disables and enables attenuation of the unmodulated and unattenuated signal according to a predetermined pattern. Furthermore, the attenuator could switch between anti-attenuation and attenuation. For instance, the anti-attenuation could increase by 5 db the unmodulated and unattenuated signal, and then attenuate by 31 db the unmodulated and unattenuated signal.

The predetermined frequency of the calibration tone preferably corresponds to the center frequency of voltage control FM oscillator 30, but is not limited thereto. Furthermore, the calibration control unit 304 preferably causes the calibration tone to be generated from 280–300 millisecond duration, but is not limited thereto. After sending the calibration tone for a given duration, the calibration control unit 304 causes switches 86 and 87 to close, and permits the control tone generator 24 to output the control tone.

Alternatively, the calibration control unit 304 could include a processor which would run the frequency hopping algorithm used by transmitter 250, in synchronization with the transmitter 250. Thus calibration control unit 304 could determine when to generate a calibration tone without receiving a signal from the transmitter 250. As a further alternative, the modulators shown in FIGS. 12 and 14 could generate a calibration tone, such as above, using a calibration tone generator 301 and switch 306 as shown in FIG. 9.

In transmitting the information waveform according to frequency hopping techniques, frequency hopping transmitter 250 will produce a certain amount of frequency error. The amount of error will differ with each channel frequency.

The demodulator of FIG. 8 receives and demodulates the information waveform via the frequency hopping receiver 252. The frequency hopping receiver 252 changes the channel frequency for demodulating the information waveform in accordance with the same frequency hopping algorithm used by the frequency hopping transmitter 250. Therefore, when frequency hopping transmitter 252 switches from transmitting at a first channel frequency to a second channel frequency, the frequency hopping receiver 252 simultaneously switches from receiving and demodulating the information waveform at the first channel frequency to the second channel frequency.

When the frequency hopping receiver 252 receives and demodulates the information waveform, the frequency hopping receiver 252 also produces frequency error which differs between channel frequencies. The frequency hopping transmitter 250, however, transmits a calibration tone at each channel frequency. A transmitted calibration tone is detected by calibration tone detector circuit 52 which enables the frequency measuring circuit 54. Once enabled, frequency measuring circuit 54 produces an error signal, representing the total of the transmitter and receiver frequency error, based on the frequency of the calibration tone detected by discriminator 48 and a reference frequency. The frequency compensation circuit 56 then compensates for transmitter frequency error and receiver frequency error at each channel frequency based on the error signal produced by the frequency measuring circuit 54. Thus, the total frequency error across the link can be eliminated.

In the method of operation described above with respect to FIGS. 8, 13(a), and 15(a), a calibration tone is transmitted each time the frequency hopping transmitter 250 transmits at a new channel frequency. At low hopping rates, this method works effectively. At higher hopping rates, however, performing calibration at each channel frequency unacceptably reduces the information transmission efficiency. In other words, the transmission of the calibration tone takes up a certain amount of transmission time which can not be used for the transmission of information. The more often the calibration tone is transmitted, the less time is spent transmitting the information waveform. Consequently, at high hopping rates information transmission efficiency decreases to an unacceptable level.

The embodiments shown in FIGS. 10, 13(b) and 15(b) overcome this problem and allow frequency compensation of an information waveform transmitted using high hopping rates by predicting the total frequency error of successive channel frequencies based on an initial one or two measured total frequency errors. Four methods of operation for the embodiments shown in FIGS. 10, 13(b) and 15(b) will now be described. The operation of the Lincompex elements in FIGS. 13(b) and FIG. 15(b) were adequately described in the background of the present invention, and, therefore will not be repeated.

A first method of operation of the embodiment shown in FIG. 10 will now be described. This first method of operation assumes that, as is typical, the frequency error produced by both the frequency hopping transmitter 250 and frequency hopping receiver 252 is proportional to the channel frequency.

At the start of operation, the frequency hopping transmitter 250 will, per the operation and calibration control unit 302, signal generator 300 and switch 306 as shown in FIG. 9, or calibration control unit 304, control tone generator 24, switch 86 and switch 87 as shown in FIGS. 12 and 14, transmit a calibration tone. As a further alternative, the modulators shown in FIGS. 12 and 14 could generate a calibration tone, such as above, using a calibration tone generator 301 and switch 306 as shown in FIG. 9. This calibration tone will be received and demodulated by frequency hopping receiver 252, and detected by calibration tone detector 52. The frequency measuring circuit 54 will then produce a frequency error signal representing the total frequency error across the communications link based on the frequency of the calibration tone determined by discriminator 48 and a reference frequency.

The predicting circuit 258 receives the frequency error signal, and the CPU 262 of predicting circuit 258, in accordance with a program stored in one of RAM 266 and ROM 264, passes the frequency error signal on to frequency compensation circuit 56. As discussed above, the stored program is a program easily coded based upon the methods of operation described herein. The program further causes CPU 262 to predict the total frequency errors of the successive channel frequencies in the frequency hopping sequence used by frequency hopping receiver 252.

In a first prediction method, the program predicts each successive total frequency error according to the following equation:

$$e_N = f_N / f_{N-1} * e_{N-1} \qquad (1)$$

where $e_N$ represents said Nth total frequency error, $f_N$ represents the Nth channel frequency in said frequency hopping sequence, $f_{N-1}$ represents the N−1 channel frequency in said frequency hopping sequence, and $e_{N-1}$ represents a total error at said N−1 channel frequency.

Alternatively, the program can determine each successive total frequency error according to the formula $$e_N = f_N / f_1 * e_1 \qquad (2)$$

where $e_N$ represents said Nth total frequency error, $f_N$ represents the Nth channel frequency in said frequency hopping sequence, $f_1$ represents said channel frequency corresponding to said first total frequency error, and $e_1$ represents said first total frequency error.

As the channel frequency changes to each new channel frequency in the frequency hopping sequence, the program causes CPU 262 to output to frequency compensation circuit 56 the total frequency error corresponding to that channel frequency as predicted using one of the above equations.

Therefore, a calibration tone need not be transmitted at each new channel frequency. Instead a calibration tone can be transmitted after a period of time which represents when the frequency error of at least one of the frequency hopping transmitter and receiver will again drift from the previously determined values. This period of time can be measured by a timer within the calibration control units 302, 304. Alternatively, calibration control units 302, 304 can include a counter which causes the calibration tone to be generated after counting a predetermined number of channel frequency changes. Since a calibration tone is not transmitted at each channel frequency, the present invention achieves high information transmission efficiency. Consequently, the information waveform can be transmitted and received at high hopping rates.

A second method of operation of the embodiments shown in FIGS. 10, 13(b) and 15(b) will now be described. The operation of this method assumes that one of the frequency hopping transmitter 250 and frequency hopping receiver 252 produces a frequency error which is proportional to the channel frequency, and the other of frequency hopping transmitter 250 and frequency hopping receiver 252 produces a frequency error having a non-linear relationship with respect to the channel frequency. This non-linear relationship can be expressed by the following: $\alpha + \beta$ where $\alpha$ is a constant which remains the same for all channel frequencies, and $\beta$ is a proportional component, proportional to the channel frequency.

At the start of operation, the frequency hopping transmitter 250 will, per the operation and calibration control unit 302, signals generator 300 and switch 306 as shown in FIG. 9, or calibration control unit 304, control tone generator 24, switch 86 and switch 87 as shown in FIGS. 12 and 14, transmit a calibration tone. As a further alternative, the modulators shown in FIGS. 12 and 14 could generate a calibration tone, such as above, using a calibration tone generator 301 and switch 306 as shown in FIG. 9. The frequency hopping receiver 252 receives and demodulates the first calibration tone, and calibration tone detector circuit 52 detects the first calibration tone. The frequency measuring circuit 54 then determines a first total frequency error based on the frequency of the calibration tone determined by discriminator 48 and a reference frequency.

The predicting circuit 258, and more specifically the CPU 262, receives an error signal from the frequency measuring circuit 54 representing the first total frequency error. The easily coded program stored in one of RAM 266 and ROM 264 causes the CPU 262 to output the first total frequency error to frequency compensation circuit 56, and to store the first total frequency error in RAM 266.

Upon switching to the second channel frequency in the frequency hopping sequence, the frequency hopping transmitter 250 will, per the operation and calibration control unit 302, signals generator 300 and switch 306 as shown in FIG. 9, or calibration control unit 304, control tone generator 24, switch 86 and switch 87 as shown in FIGS. 12 and 14, transmit a calibration tone, transmits a second calibration tone. This second calibration tone is received and demodulated by frequency hopping receiver 252, and detected by calibration tone detector circuit 52. The frequency measuring circuit 54 then determines a second total frequency error based on the frequency of the second calibration tone determined by discriminator 48 and the reference frequency.

The CPU 262 of predicting circuit 258 receives an error signal from the frequency measuring circuit 54 representing the second total frequency error, and, in accordance with the stored program, outputs the second total frequency to frequency compensation circuit 56. The program then predicts the total frequency errors for successive channel frequencies based on the second total frequency error and the first total frequency error stored in RAM 266.

In predicting the successive total frequency errors, the program first determines the constant component $\alpha$ of the frequency error for the one of the frequency hopping transmitter 250 and frequency hopping receiver 252 producing a frequency error having a non-linear relationship with respect to the channel frequency. This constant component $\alpha$ is determined according to the following equation:

$$\alpha = \frac{\frac{f_n}{f_{n-1}} e_{n-1} - e_n}{\left(\frac{f_n}{f_{n-1}} - 1\right)} \quad (3)$$

where $\alpha$ represents the constant component, $f_n$ represents the frequency of the Nth channel frequency, $f_{n-1}$ represents the frequency of the N−1 channel frequency, $e_n$ represents a total frequency error at the Nth channel frequency, and $e_{n-1}$ represents a total frequency error at the N−1 channel frequency.

At the start of operation discussed above, the Nth channel frequency will represent the second channel frequency, and the N−1 channel frequency will represent the first channel frequency. This, however, may not be the case in subsequent iterations of the prediction operation. After determining the constant component $\alpha$, which will be the same for all channel frequencies, the program then determines the successive total frequency errors according to the following equation:

$$e_{n+1} = \frac{f_{n+1}}{f_n} e_n - \left(\frac{f_{n+1}}{f_n} - 1\right)\alpha \quad (4)$$

where $\alpha$ represents the constant component, $f_{n+1}$ represents the frequency of the N+1 channel frequency, $f_n$ represents the frequency of the Nth channel frequency, $e_{n+1}$ represents a total frequency error at the N+1 channel frequency, and $e_n$ represents a total frequency error at the Nth channel frequency.

Again, at the start of operation discussed above, the Nth channel frequency and Nth total frequency error will be the second channel frequency and second channel frequency error, respectively. As the frequency hopping receiver 252 switches to each successive channel frequency, the program causes CPU 262 to output the corresponding total frequency error predicted to frequency compensation circuit 56.

In this embodiment, a calibration tone for consecutive channel frequencies is transmitted. But as discussed above with respect to the first method of operation, the calibration control units 302, 304 will not cause the frequency hopping transmitter 250 to transmit another pair of calibration tones at successive channel frequencies until after a period of time representing a period of time in which at least one of the transmitter frequency error and receiver frequency error drifts from that of the previous values.

To perform the above described function, calibration control units 302,304 can include a counter which counts the number of calibration tones transmitted so that the calibration control units 302, 304 can determine and limit the sending of calibration tones to two consecutive calibration tones as described above. As with the first method of operation, this method of operation does not require that a calibration tone be transmitted at each channel frequency. Therefore, the frequency hopping transmitter 250 can transmit and the frequency hopping receiver 252 can receive the information waveform at high hopping rates.

As an alternative to calculating the constant component $\alpha$, a user may predetermine the constant component, and store the constant component in RAM 266 for use by CPU 262.

A third method of operation of the embodiments illustrated in FIGS. 10, 13(b), and 15(b) will now be described. In this third method of operation, it is assumed that the frequency error produced by the frequency hopping transmitter 250 can have a linear or non-linear relationship with respect to the channel frequency, and the frequency error produced by the frequency hopping receiver 252 can have a linear or non-linear relationship with respect to the channel frequency.

At the start of operation, the frequency hopping transmitter 250 will, per the operation and calibration control unit 302, signals generator 300 and switch 306 as shown in FIG. 9, or calibration control unit 304, control tone generator 24, switch 86 and switch 87 as shown in FIGS. 12 and 14, transmit a calibration tone. As a further alternative, the modulators shown in FIGS. 12 and 14 could generate a calibration tone, such as above, using a calibration tone generator 301 and switch 306 as shown in FIG. 9. The frequency hopping receiver 252 receives and demodulates the calibration tone, and the calibration tone detector circuit 52 detects the received calibration tone. The frequency measuring circuit 54, enabled by the detection of the calibration tone by calibration tone detector circuit 52, determines a total frequency error based on the frequency of the calibration tone determined by discriminator 48 and a reference frequency.

The CPU 262 of predicting circuit 258 receives an error signal generated by the frequency measuring circuit 54 representing the total frequency error, and the easily coded program stored in one of RAM 266 and ROM 264 causes CPU 262 to output the total frequency error to frequency compensation circuit 56. The program also predicts the total frequency errors for the successive channel frequencies as follows.

One of ROM 264 and RAM 266 stores a look-up table. The look-up table contains a plurality of total frequency errors. Each total frequency error of the look-up table can be addressed by a channel frequency and a total frequency error corresponding to that channel frequency. The total frequency error addressed by a channel frequency and the corresponding total frequency error is the total frequency error for the next channel frequency in the frequency hopping sequence. A successive total frequency error read from the look-up table can then be used by the program to read the next successive total frequency error. By having measured at least one total frequency error, the program can determine, by reading from the look-up table stored in one of ROM 264 and RAM 266, the successive total frequency errors. As the frequency hopping receiver switches to each successive channel frequency, the program causes CPU 262 to output the corresponding total frequency error predicted to frequency compensation circuit 56.

As discussed above with respect to the first method of operation, the calibration control units 302, 304 will not cause the frequency hopping transmitter 250 to transmit another calibration tone until after a period of time in which at least one of the transmitter frequency error and receiver frequency error drifts from that of the previous values. As with the first method of operation, this method of operation does not require that a calibration tone be transmitted at each channel frequency. Therefore, the frequency hopping transmitter 250 can transmit and the frequency hopping receiver 252 can receive the information waveform at high hopping rates.

Furthermore, the inventor contemplates that in a preferred embodiment, the look-up table will be stored in RAM 266. Storage of the look-up table in RAM 256 will allow a user of the telecommunications system to easily replace and/or change the look-up table within RAM 266.

A fourth method of operation for the embodiment shown in FIGS. 10, 13(b), and 15(b) will now be described. The operation of the fourth embodiment is similar to that of the third embodiment except that one of ROM 264 and RAM 266 does not store a look-up table. Instead, one of ROM 264 and RAM 266 stores an equation approximating a curve representing the successive total frequency errors. Applying the stored equation to the channel frequency and the total frequency error measured by the frequency measuring circuit 54, the program can determine the total frequency error for the next channel frequency. By repeating this operation for each subsequently determined total frequency error, the program can determine the successive frequency errors for the successive channel frequencies. As the frequency hopping receiver 252 switches to each successive channel frequency, the program causes CPU 262 to output the corresponding total frequency error predicted to the frequency compensation circuit 56.

As discussed above with respect to the first method of operation, the calibration control units 302, 304 will not cause the frequency hopping transmitter to transmit another calibration tone until after a period of time in which at least one of the transmitter frequency error and receiver frequency error drifts from that of the previous values. As with the first method of operation, this method of operation does not require that a calibration tone be transmitted at each channel frequency. Therefore, the frequency hopping transmitter 250 can transmit and the frequency hopping receiver 252 can receive the information waveform at high hopping rates.

The invention being thus described, it will be obvious that the same may be varied in many ways. Such variations are not to be regarded as departure from the spirit of scope of the invention, and all such modifications would be obvious to one skilled in the art are intended to be included within the scope of the following claims:

I claim:

1. A method for receiving an information waveform and calibration tone transmitted over a communication channel using frequency hopping techniques wherein a transmitter transmits said information waveform and said calibration tone by hopping to different channel frequencies determined by a frequency hopping algorithm, comprising the steps of:

(a) receiving and demodulating, with a receiver, a calibration tone, said transmitter transmitting said calibration tone each time said transmitter changes a channel frequency, said calibration tone being independently distinguishable from said information waveform, and said receiver hopping to said different channel frequencies in accordance with said frequency hopping algorithm;

(b) receiving and demodulating, with said receiver, said information waveform, and said receiver hopping to said different channel frequencies in accordance with said frequency hopping algorithm;

(c) determining a frequency of said calibration tone as received in said step (a);

(d) determining a frequency error by comparing output from said step (c) to a reference frequency; and (e) frequency compensating said information waveform received in step (b) according to said frequency error.

2. The method of claim 1, wherein said step (b) receives said information waveform which includes a compressed voice signal and an envelope signal represented by a control tone.

3. The method of claim 2, further comprising the steps of:

(f) separating said information waveform into said compressed voice signal and said envelope signal;

(g) determining said frequency of said control tone;

(h) producing a signal corresponding to said frequency of said control tone determined in said step (g);

(i) calculating an anti-log function of said signal produced in said step (j); and (j) producing a frequency signal corresponding to calculations carried out in said step (i);

(k) expanding said compressed voice signal by multiplying said compressed voice signal by a frequency signal corresponding to said frequency of said control tone determined in said step (j); and wherein said step (e) frequency compensates said information waveform prior to said step (f).

4. The method of claim 1, wherein said step (b) receives said information waveform which is a complex waveform including a compressed data signal and an envelope signal represented by a control tone, said complex waveform being frequency shifted in said transmitter prior to transmission to eliminate overlap between said compressed data signal and said envelope signal.

5. The method of claim 4, further comprising the steps of:

(f) separating said complex waveform into said compressed data signal and said envelope signal;

(g) determining said frequency of said control tone;

(h) producing a signal corresponding to said frequency of said control tone determined in said step (g);

(i) calculating an anti-log function of said signal produced in said step (h); and (j) producing a frequency signal corresponding to calculations carried out in said step (i);

(k) expanding said compressed data signal by multiplying said compressed data signal by a frequency signal corresponding to said frequency of said control tone determined in said step (j); and wherein said step (e) frequency compensates said complex waveform prior to said step (f).

6. A method for receiving an information waveform and calibration tone transmitted over a communication channel using frequency hopping techniques wherein a transmitter transmits said information waveform and said calibration tone by hopping to different channel frequencies determined by a frequency hopping algorithm, said transmitter producing transmitter frequency error, said method comprising the steps of:

(a) receiving and demodulating, with a receiver, a calibration tone transmitted by said transmitter, said calibration tone being independently distinguishable from said information waveform, said receiver producing receiver frequency error;

(b) receiving and demodulating, with said receiver, said information waveform, said receiver hopping to said different channel frequencies in accordance with said frequency hopping algorithm, and said receiver producing said receiver frequency error;

(c) determining a frequency of said calibration tone as received by said step (a);

(d) determining a first total frequency error associated with a current channel frequency by comparing output from said step (c) to a reference frequency;

(e) frequency compensating said information waveform received in step (b) according to said first total frequency error determined in said step (d);

(f) predicting successive total frequency errors for successive channel frequencies in said frequency hopping sequence based on said first total frequency error determined in said step (d).

7. The method of claim 6, further comprising the step of (g) successively frequency compensating said information waveform received in step (b) according to said successive total frequency errors determined in said step (f) for said successive channel frequencies.

8. The method of claim 6, wherein said step (a) receives said calibration tone, transmitted by said transmitter which produces said transmitter frequency error proportional to said channel frequency, using said receiver which produces said receiver frequency error proportional to said channel frequency.

9. The method of claim 8, wherein said step (f) predicts an Nth total frequency error according to the formula $e_N = f_N/f_{N-1} * e_{N-1}$, where $e_N$ represents said Nth total frequency error, $f_N$ represents the Nth channel frequency in said frequency hopping sequence, $f_{N-1}$ represents the N−1 channel frequency in said frequency hopping sequence, and $e_{N-1}$ represents a total frequency error at said N−1 channel frequency.

10. The method of claim 8, wherein said step (f) predicts an Nth total frequency error according to the formula $e_N = f_N/f_1 * e_1$, where $e_N$ represents said Nth total frequency error, $f_N$ represents the Nth channel frequency in said frequency hopping sequence, $f_1$ represents said channel frequency corresponding to said first total frequency error, and $e_1$ represents said first total frequency error.

11. The method of claim 6, wherein said step (a) receives said calibration tone transmitted by said transmitter which produces said transmitter frequency error having a non-linear relationship with said channel frequency.

12. The method of claim 11, wherein said step (a) receives said calibration tone transmitted by said transmitter which produces said transmitter frequency error, said transmitter frequency error has a first component and a second component, said first component is a constant and said second component is proportional to said channel frequency; and wherein said step (a) receives said calibration tone using said receiver which produces said receiver frequency error proportional to said channel frequency.

13. The method of claim 12, further comprising the steps of:

(g) repeating said steps (a), (c), (d), and (e) prior to said step (f) for a second channel frequency, thus determining a second total frequency error; and wherein said step (f) includes predicting total frequency error for said successive channel frequencies based on said first total frequency error and said second total frequency error.

14. The method of claim 13, wherein said step (f) comprises the steps of:

(f1) calculating said first component based on said first total frequency error and said second total frequency error; and (f2) calculating said successive total frequency errors based on said first component.

15. The method of claim 6, wherein said step (a) receives said calibration tone using said receiver which produces receiver frequency error having a non-linear relationship with said channel frequency.

16. The method of claim 15, wherein said step (a) receives said calibration tone transmitted by said transmitter which produces said transmitter frequency error proportional to said channel frequency; and wherein said step (a) receives said calibration tone using said receiver which produces said receiver frequency error, said receiver frequency error has a first and second component, said first component is a constant and said second component is proportional to said channel frequency.

17. The method of claim 16, further comprising the steps of:

(g) repeating said steps (a), (c), (d), and (e) prior to said step (f) for a second channel frequency, thus determining a second total frequency error; and wherein said step (f) includes predicting total frequency error for said successive channel frequencies based on said first total frequency error and said second total frequency error.

18. The method of claim 17, wherein said step (f) comprises the steps of:

(f1) calculating said first component based on said first total frequency error and said second total frequency error; and (f2) calculating said successive total frequency errors based on said first component.

19. The method of claim 6, wherein said step (f) comprises the steps of:

(f1) reading from a look up table said successive total frequency errors based on said first total frequency error and said channel frequency corresponding to said first total frequency error.

20. The method of claim 6, wherein said step (f) comprises the steps of:

(f1) reading an equation from memory based on said first total frequency error, said equation approximating a curve representing said successive frequency errors; and (f2) determining said successive total frequency errors by applying said equation to said successive channel frequencies.

21. The method of claim 11, wherein said step (a) receives said calibration tone using said receiver which produces said receiver frequency error having a non-linear relationship with said channel frequency.

22. The method of claim 6, wherein step (a) receives said calibration tone at the beginning of each frequency hopping sequence.

23. The method of claim 6, wherein step (a) receives said calibration tone periodically.

24. The method of claim 6, wherein said step (b) receives said information waveform which includes a compressed voice signal and an envelope signal represented by a control tone.

25. The method of claim 24, further comprising the steps of:

(f) separating said information waveform into said compressed voice signal and said envelope signal;

(g) determining said frequency of said control tone;

(h) producing a signal corresponding to said frequency of said control tone determined in said step (g);

(i) calculating an anti-log function of said signal produced in said step (j); and (j) producing a frequency signal corresponding to calculations carried out in said step (i);

(k) expanding said compressed voice signal by multiplying said compressed voice signal by a frequency signal corresponding to said frequency of said control tone determined in said step (j); and wherein said step (e) frequency compensates said information waveform prior to said step (f).

26. The method of claim 25, wherein said step (b) receives said information waveform which is a complex waveform including a compressed data signal and an envelope signal, said complex waveform being frequency shifted in said transmitter prior to transmission to eliminate overlap between said compressed data signal and said envelope signal.

27. The method of claim 26, further comprising the steps of:
(f) separating said complex waveform into said compressed data signal and said envelope signal;
(g) determining said frequency of said control tone;
(h) producing a signal corresponding to said frequency of said control tone determined in said step (g);
(i) calculating an anti-log function of said signal produced in said step (h); and
(j) producing a frequency signal corresponding to calculations carried out in said step (i);
(k) expanding said compressed data signal by multiplying said compressed data signal by a frequency signal corresponding to said frequency of said control tone determined in said step (j); and wherein
said step (e) frequency compensates said complex waveform prior to said step (f).

28. An apparatus for receiving an information waveform and calibration tone transmitted over a communication channel using frequency hopping techniques wherein a transmitter transmits said information waveform and said calibration tone by hopping to different channel frequencies determined by a frequency hopping algorithm, comprising:
a receiver receiving and demodulating an information waveform and a calibration tone, said calibration tone being transmitted by a transmitter each time said transmitter changes the channel frequency, said calibration tone being independently distinguishable from said information waveform, and said receiver hopping to said different channel frequencies in accordance with said frequency hopping algorithm;
a frequency measuring circuit determining a frequency error based on said calibration tone received by said receiver; and
a frequency compensating circuit, operatively connected to said receiver, compensating said information waveform according to said frequency error.

29. The apparatus of claim 28, wherein said receiver includes said frequency compensating circuit.

30. The apparatus of claim 28, wherein said receiver receives said information waveform which includes a compressed voice signal and an envelope signal represented by a control tone.

31. The apparatus of claim 30, further comprising:
filter means separating said information waveform into said compressed voice signal and said envelope signal;
a discriminator determining a frequency of said control tone, and producing a signal corresponding to said frequency of said control tone;
an anti-log circuit calculating an anti-log function of said signal produced by said discriminator, and producing a frequency signal corresponding to said calculating;
an expander expanding said compressed voice signal by multiplying said compressed voice signal by said frequency signal; and wherein
said frequency compensating circuit frequency compensates said information waveform prior to said filter means receiving said information waveform.

32. The apparatus of claim 28, wherein said receiver receives said information waveform which is a complex waveform including a compressed data signal and an envelope signal, said complex waveform being frequency shifted in said transmitter prior to transmission to eliminate overlap between said compressed data signal and said envelope signal.

33. The apparatus of claim 32, further comprising:
filter means separating said complex waveform into said compressed data signal and said envelope signal;
a discriminator determining a frequency of said control tone, and producing a signal corresponding to said frequency of said control tone;
an anti-log circuit calculating an anti-log function of said signal produced by said discriminator, and producing a frequency signal corresponding to said calculating;
an expander expanding said compressed voice signal by multiplying said compressed data signal by said frequency signal; and wherein
said frequency compensating circuit frequency compensates said complex waveform prior to said filter means receiving said complex waveform.

34. An apparatus for receiving an information waveform transmitted over a communication channel using frequency hopping techniques wherein a transmitter transmits said information waveform and said calibration tone by hopping to different channel frequencies determined by a frequency hopping algorithm, comprising:
a receiver receiving and demodulating an information waveform and a calibration tone, said calibration tone being transmitted by a transmitter each time said transmitter changes a channel frequency, said calibration tone being independently distinguishable from said information waveform, and said receiver hopping to said different channel frequencies in accordance with said frequency hopping algorithm;
a frequency measuring circuit determining a first total frequency error associated with a current channel frequency based on said calibration tone received by said receiver;
a frequency compensating circuit frequency compensating said information waveform according to said first total frequency error; and
a predicting circuit predicting successive total frequency errors for successive channel frequencies in said frequency hopping sequence based on said first total frequency error.

35. The apparatus of claim 34, wherein said receiver includes said frequency compensating circuit and said predicting circuit.

36. The apparatus of claim 34, said frequency compensating circuit successively frequency compensating said information waveform according to said successive total frequency errors for said successive channel frequencies.

37. The apparatus of claim 34, wherein said receiver receives said calibration tone transmitted by said transmitter producing a transmitter frequency error proportional to said channel frequency, and said receiver produces a receiver frequency error proportional to said channel frequency.

38. The apparatus of claim 37, wherein said predicting circuit predicts an Nth total frequency error according to the formula $e_N = f_N/f_{N-1} * e_{N-1}$, where $e_N$ represents said Nth total frequency error, $f_N$ represents the Nth channel frequency in said frequency hopping sequence, $f_{N-1}$ represents the N-1 channel frequency in said frequency hopping sequence, and $e_{N-1}$ represents a total frequency error at said N-1 channel frequency.

39. The apparatus of claim 37, wherein said predicting circuit predicts an Nth total frequency error according to the formula $e_N = f_N/f_1 * e_1$, where $e_N$ represents said Nth total frequency error, $f_N$ represents the Nth channel frequency in said frequency hopping sequence, $f_1$ represents said channel frequency corresponding to said first total frequency error, and $e_1$ represents said first total frequency error.

40. The apparatus of claim 34, wherein one of said receiver and said transmitter produces a frequency error which has a non-linear relationship with said channel frequency.

41. The apparatus of claim 40, wherein said one of said receiver and said transmitter produces a frequency error having a first component and a second component, said first component is a constant and said second component is proportional to said channel frequency, and the other one of said receiver and said transmitter produces a frequency error proportional to said channel frequency.

42. The apparatus of claim 41, wherein said receiver receives another calibration tone while receiving said information waveform at a new channel frequency prior to said predicting by said predicting circuit;

said frequency measuring circuit determines a second total frequency error prior to said predicting by said predicting circuit based on said another calibration tone;

said frequency compensating circuit frequency compensates said information waveform based on said second total frequency error prior to said predicting by said predicting circuit; and said predicting circuit predicts total frequency errors for said successive channel frequencies based on said first total frequency error and said second total frequency error.

43. The apparatus of claim 42, wherein said predicting circuit comprises:

a first calculating circuit calculating said first component based on said first total frequency error and said second total frequency error; and a second calculating circuit calculating said successive total frequency errors based on said first component.

44. The apparatus of claim 34, wherein the other one of said receiver and said transmitter produces a frequency error having a non-linear relationship with said channel frequency.

45. The apparatus of claim 34, wherein said predicting circuit comprises:

a look up table storing said successive total frequency errors; and wherein said predicting circuit reads said successive total frequency errors based on said first total frequency error and said channel frequency corresponding to said first total frequency error.

46. The apparatus of claim 34, wherein said predicting circuit comprises:

a memory storing equations approximating curves representing said successive frequency errors; and wherein said predicting circuit reads an equation from said memory based on said first total frequency error, and determines said successive total frequency errors by applying said equation to said successive channel frequencies.

47. The apparatus of claim 34, wherein said receiver receives said calibration tone at the beginning of each frequency hopping sequence.

48. The apparatus of claim 34, wherein said receiver receives said calibration tone periodically.

49. The apparatus of claim 34, wherein said receiver receives said information waveform which includes a compressed voice signal and an envelope signal represented by a control tone.

50. The apparatus of claim 49, further comprising:

filter means separating said information waveform into said compressed voice signal and said envelope signal;

a discriminator determining a frequency of said control tone, and producing a signal corresponding to said frequency of said control tone;

an anti-log circuit calculating an anti-log function of said signal produced by said discriminator, and producing a frequency signal corresponding to said calculating;

an expander expanding said compressed voice signal by multiplying said compressed voice signal by said frequency signal; and wherein said frequency compensating circuit frequency compensates said information waveform prior to said filter means receiving said information waveform.

51. The apparatus of claim 50, further comprising:

a calibration tone detecting circuit detecting said calibration tone, and producing an enabling signal representing said detection of said calibration tone; and wherein said frequency measuring circuit determines said frequency error when said enabling signal is received.

52. The apparatus of claim 34, wherein said receiver receives said information waveform which is a complex waveform including a compressed data signal and an envelope signal, said complex waveform being frequency shifted in said transmitter prior to transmission to eliminate overlap between said compressed data signal and said envelope signal.

53. The apparatus of claim 52, further comprising:

filter means separating said complex waveform into said compressed data signal and said envelope signal;

a discriminator determining a frequency of said control tone, and producing a signal corresponding to said frequency of said control tone;

an anti-log circuit calculating an anti-log function of said signal produced by said discriminator, and producing a frequency signal corresponding to said calculating;

an expander expanding said compressed voice signal by multiplying said compressed data signal by said frequency signal; and wherein said frequency compensating circuit frequency compensates said complex waveform prior to said filter means receiving said complex waveform.

54. The apparatus of claim 53, further comprising:

a calibration tone detecting circuit detecting said calibration tone, and producing an enabling signal representing said detection of said calibration tone; and wherein said frequency measuring circuit determines said frequency error when said enabling signal is received.

55. A method for transmitting an information waveform over a communications channel using frequency hopping techniques, comprising the steps of:

(a) inputting an information waveform;

(b) transmitting, with a transmitter, said information waveform by hopping to different channel frequencies determined by a frequency hopping algorithm;

(c) transmitting a calibration tone each time said transmitter changes a channel frequency.

56. The method of claim 55, wherein said step (c) includes the steps of:

(c1) outputting from said transmitter a change indication signal indicating that said transmitter is changing said channel frequency;

(c2) disconnecting a supply of said information waveform to said transmitter in response to said change indication signal; and (c3) outputting a calibration tone to said transmitter in response to said change indication signal.

57. A method for transmitting an information waveform over a communications channel using frequency hopping techniques, comprising the steps of:

(a) inputting an information waveform;

(b) transmitting, with a transmitter, said information waveform by hopping to different channel frequencies determined by a frequency hopping algorithm;

(c) transmitting a calibration tone after a predetermined number of channel frequency changes.

58. The method of claim 55, wherein said step (c) includes the steps of:

(c1) outputting from said transmitter a change indication signal indicating that said transmitter is changing said channel frequency;

(c2) incrementing a count of said change indication signals;

(c2) disconnecting a supply of said information waveform to said transmitter when said count exceeds a predetermined threshold; and (c3) outputting a calibration tone to said transmitter when said count exceeds said predetermined threshold.

59. A method for transmitting an information waveform over a communications channel using frequency hopping techniques, comprising the steps of:

(a) inputting an information waveform;

(b) transmitting, with a transmitter, said information waveform by hopping to different channel frequencies determined by a frequency hopping algorithm;

(c) periodically transmitting a calibration tone.

60. An apparatus for transmitting an information waveform over a communications channel using frequency hopping techniques, comprising:

a transmitter which transmits an information waveform by hopping to different channel frequencies determined by a frequency hopping algorithm, said transmitter generating a change indication signal when changing said channel frequency;

a tone generator which generates a calibration tone;

switch means, connected between said transmitter, an input receiving said information waveform and said tone generator, for controlling a connection of said transmitter to said input and said tone generator; and a control unit which, based on said change indication signal, causes said switch to disconnect said input from said transmitter and to connect said tone generator to said transmitter.

61. The apparatus of claim 60, wherein said control unit causes said switch to disconnect said input from said transmitter and to connect said tone generator to said transmitter in response to each change indication signal.

62. The apparatus of claim 60, wherein said control unit increments a count in response to each change indication signal, and causes said switch to disconnect said input from said transmitter and to connect said tone generator to said transmitter when said count exceeds a predetermined threshold.

63. The apparatus of claim 60, further comprising:

a compressor compressing said information waveform based on an envelope of said information waveform; and wherein said tone generator includes a control tone generator which generates and outputs said envelope to said compressor, generates and outputs a control tone representing said envelope to a summer, and which, in response to a control signal, stops outputting said control tone to said summer, and generates and outputs said calibration tone to said summer;

said switch means includes,
said summer connected to said compressor, said tone generator and said transmitter;
a first switch, connected between said compressor and said summer, for disconnecting said compressor from said summer in response to said control signal; and said control unit generates said control signal based on said change indication signal.

64. The apparatus of claim 63, wherein said switch includes a second switch connected between said summer and said transmitter for disconnecting and reconnecting said summer to said transmitter in response to said control signal.

65. An apparatus for transmitting an information waveform over a communications channel using frequency hopping techniques, comprising:

a transmitter which transmits an information waveform by hopping to different channel frequencies determined by a frequency hopping algorithm;

a tone generator which generates a calibration tone;

switch means, connected between said transmitter, an input receiving said information waveform and said tone generator, for controlling a connection of said transmitter to said input and said tone generator; and a control unit which periodically causes said switch means to disconnect said input from said transmitter and to connect said tone generator to said transmitter.

* * * * *